United States Patent
Nomura

(10) Patent No.: US 11,930,138 B2
(45) Date of Patent: Mar. 12, 2024

(54) MANAGEMENT APPARATUS, SYSTEM, AND MANAGEMENT METHOD

(71) Applicant: KONICA MINOLTA, INC., Tokyo (JP)

(72) Inventor: Izuru Nomura, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/712,256

(22) Filed: Apr. 4, 2022

(65) Prior Publication Data

US 2022/0345575 A1     Oct. 27, 2022

(30) Foreign Application Priority Data

Apr. 26, 2021 (JP) .................................. 2021-073883

(51) Int. Cl.
H04N 1/00        (2006.01)
H04N 1/21        (2006.01)
H04N 1/44        (2006.01)

(52) U.S. Cl.
CPC ..... *H04N 1/00344* (2013.01); *H04N 1/00037* (2013.01); *H04N 1/00076* (2013.01); *H04N 1/00244* (2013.01); *H04N 1/21* (2013.01); *H04N 1/4426* (2013.01)

(58) Field of Classification Search
None
See application file for complete search history.

(56) References Cited

U.S. PATENT DOCUMENTS

| | | | |
|---|---|---|---|
| 2008/0178265 A1* | 7/2008 | Tsuchiya | G06Q 20/40 726/3 |
| 2009/0279138 A1* | 11/2009 | Oba | G06F 16/53 358/1.15 |
| 2011/0063668 A1* | 3/2011 | Shirai | G06F 3/1204 358/1.15 |
| 2014/0355035 A1* | 12/2014 | Yamada | G06F 3/1292 358/1.14 |
| 2017/0083265 A1* | 3/2017 | Watanabe | G03G 15/5075 |
| 2017/0257496 A1* | 9/2017 | Nagasaki | G06F 3/121 |
| 2019/0174018 A1* | 6/2019 | Kawabata | H04N 1/00244 |

FOREIGN PATENT DOCUMENTS

| | | | | |
|---|---|---|---|---|
| CN | 101087345 | * | 12/2007 | ............ H04N 1/00 |
| JP | 2008210060 | * | 9/2008 | ............ G06F 3/12 |
| JP | 2015201116 | * | 11/2015 | ............ G06F 3/12 |
| JP | 2016039458 | * | 3/2016 | ............ H04N 1/00 |
| JP | 2016182712 | * | 10/2016 | ............ G03G 21/00 |
| JP | 6054441 | * | 12/2016 | ............ H04N 1/00 |
| JP | 2017059977 | * | 3/2017 | ............ H04N 1/00 |
| JP | 2019200653 A | | 11/2019 | |

* cited by examiner

*Primary Examiner* — Beniyam Menberu
(74) *Attorney, Agent, or Firm* — BUCHANAN INGERSOLL & ROONEY PC

(57) ABSTRACT

A management apparatus that manages a plurality of image forming apparatuses, the management apparatus includes: a storage that stores histories of user operations on the image forming apparatuses for the plurality of image forming apparatuses, respectively; and a hardware processor that determines an image forming apparatus recommended to be operated from among the plurality of image forming apparatuses based on the histories of the user operations of the image forming apparatuses and outputs a notification indicating the determined recommended image forming apparatus.

16 Claims, 18 Drawing Sheets

FIG. 12

|  | MFP(A) | MFP(B) | MFP(C) |
|---|---|---|---|
| FRONT DOOR | 10:30 | – | 12:30 |
| REAR DOOR | 10:30 | – | 12:30 |
| TRAY 1 | 10:30 | 11:30 | 12:30 |
| TRAY 2 | 10:30 | – | 12:30 |
| MANUAL FEED TRAY | 10:30 | – | 9:30 |
| TOUCH PANEL | 10:30 | 11:30 | 9:30 |
| ADF | 10:30 | – | 9:30 |
| OUTPUT TRAY | 10:30 | 11:30 | – |

USER ID

FIG. 13

|  | MFP(A) | MFP(B) | MFP(C) |
|---|---|---|---|
| FRONT DOOR | 2 | 1 | 3 |
| REAR DOOR | 2 | 1 | 3 |
| TRAY 1 | 1 | 2 | 3 |
| TRAY 2 | 2 | 1 | 3 |
| MANUAL FEED TRAY | 3 | 1 | 2 |
| TOUCH PANEL | 2 | 3 | 1 |
| ADF | 3 | 1 | 2 |
| OUTPUT TRAY | 2 | 3 | 1 |

MANAGEMENT APPARATUS, SYSTEM, AND MANAGEMENT METHOD

The entire disclosure of Japanese patent Application No. 2021-073883, filed on Apr. 26, 2021, is incorporated herein by reference in its entirety.

BACKGROUND

Technological Field

The present disclosure relates to a management apparatus, a system, and a method, and more particularly, to a management apparatus, a system, and a method for managing a plurality of image forming apparatuses.

Description of the Related Art

JP 2019-200653 A discloses a configuration in which a plurality of users shares an image and an image can be easily printed and output from an image printing apparatus. More specifically, an image printing system of JP 2019-200653 A includes: a server apparatus that receives image data from a first user terminal, generates identification information for identifying a saving area saving the image data, and transmits position information and the identification information for accessing the saving area to the first user terminal; and the image printing apparatus that receives an input of identification information and notifies the server apparatus of the input identification information. When being notified of identification information from the image printing apparatus, the server apparatus transmits image data stored in a saving area corresponding to the identification information to the image printing apparatus. The image printing apparatus performs print processing using the image data received from the server apparatus, and outputs a printout.

In an environment where a plurality of image forming apparatuses can be used, there is a demand for a technique for performing management so as to prevent a specific image forming apparatus from being intensively used by users.

For example, in a case where a virus affecting a human body is prevalent, preventive measures not to be infected with the virus to infect others. In particular, attention is required for use of a device shared by a plurality of users. A plurality of image forming apparatuses is installed in the office. There is a possibility that a user is infected by touching an image forming apparatus touched by a virus-infected person because it is not known when and by whom the image forming apparatuses have been operated.

SUMMARY

Therefore, in an environment where a plurality of image forming apparatuses is used by a plurality of users, there is a demand for a technique for managing an image forming apparatus that is recommended to be operated based on a history of which each of the image forming apparatuses is operated by the user.

To achieve the abovementioned object, according to an aspect of the present invention, a management apparatus that manages a plurality of image forming apparatuses, reflecting one aspect of the present invention comprises: a storage that stores histories of user operations on the image forming apparatuses for the plurality of image forming apparatuses, respectively; and a hardware processor that determines an image forming apparatus recommended to be operated from among the plurality of image forming apparatuses based on the histories of the user operations of the image forming apparatuses and outputs a notification indicating the determined recommended image forming apparatus.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 12 is a view schematically illustrating a configuration of an operation history management table according to the present embodiment;

FIG. 13 is a view schematically illustrating a configuration of a first priority table according to the present embodiment;

DETAILED DESCRIPTION OF EMBODIMENTS

Hereinafter, one or more embodiments of the present invention will be described with reference to the drawings. However, the scope of the invention is not limited to the disclosed embodiments. In the following description, the same parts and components will be denoted by the same reference signs. Their names and functions are the same. Therefore, these descriptions will not be repeated.

A. Configuration of System

Figure 1:
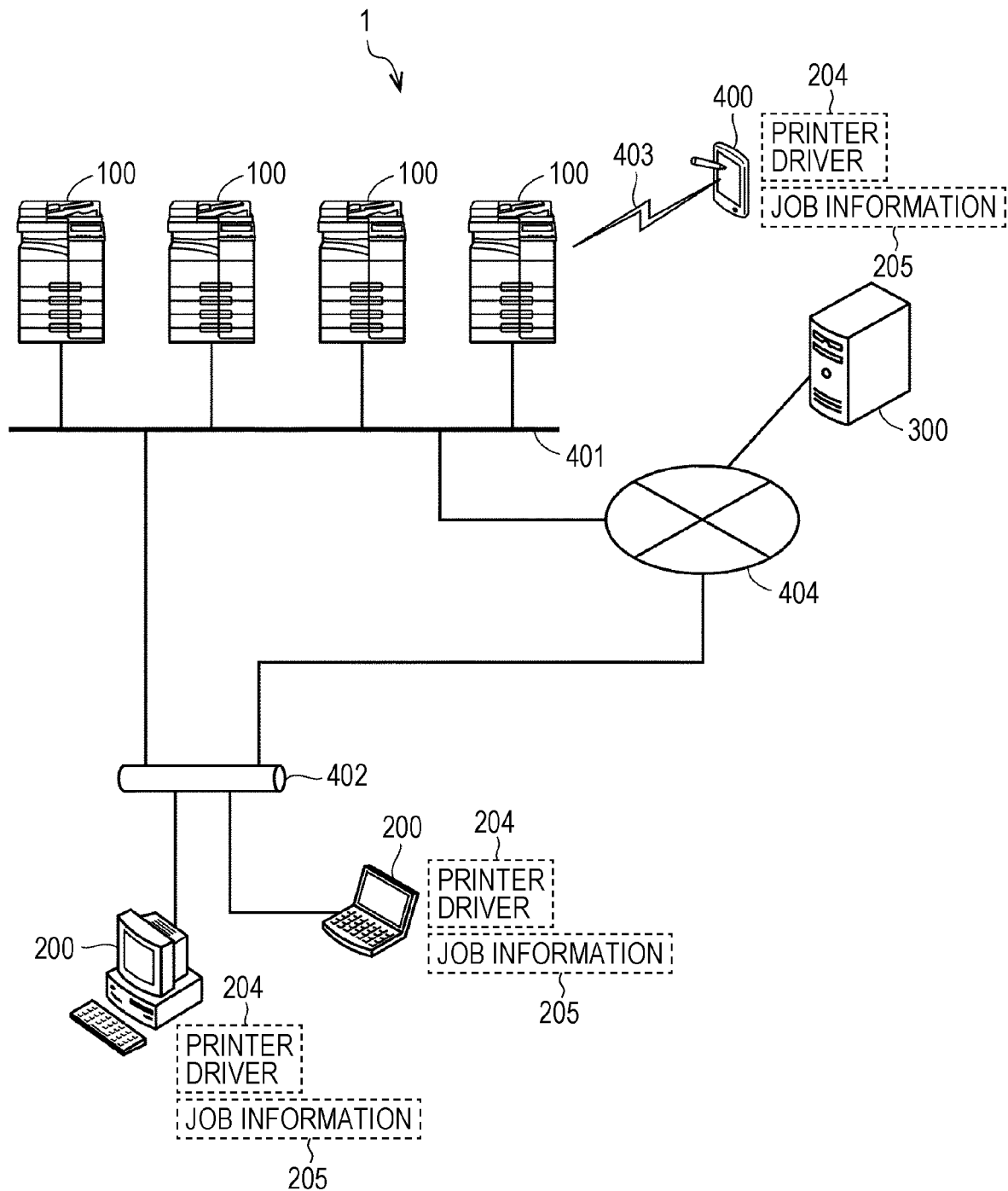
FIG. 1 is a diagram illustrating a schematic configuration of a system according to the present embodiment.

FIG. 1 is a diagram illustrating a schematic configuration of a system according to the present embodiment. In the present embodiment, MFPs, which are multi-function machines of a copier, a printer, a facsimile machine, and the like are illustrated as examples of an image forming apparatuses, but the image forming apparatuses are not limited to the MFP, and may be apparatuses such as a copier, a printer, and a facsimile machine.

In the present embodiment, a "user" indicates a person who uses or operates an image forming apparatus, and includes not only a general user of the image forming apparatus but also a maintenance service person for maintenance, repair, and management of the image forming apparatus. In the present embodiment, a "user operation" on an image forming apparatus is a concept including user operations on the image forming apparatus in a scene in which the image forming apparatus is used, and the user operation may also include that the user touches (operates with a hand) the image forming apparatus with a hand.

In the present embodiment, an "operation time" includes a period of time during which a user operation on an image forming apparatus has been detected (a time from the start to the end of the detected operation) or a time when the operation has been detected. A "latest operation time" indicates the most recently (immediately previous) detected operation time regarding an image forming apparatus. An "operation elapsed time" indicates an elapsed time from the latest operation time.

Referring to FIG. 1, a system 1 includes a plurality of MFPs 100, a plurality of information processing apparatuses 200, a server 300, and a mobile terminal 400 such as a smartphone. These are connectable to wired or wireless networks 401, 402 and 404. The plurality of information processing apparatuses 200 includes a stationary computer or a portable computer. In a case where the mobile terminal 400 is a type of portable computer, the mobile terminal 400 can be an example of the information processing apparatus 200. The system 1 is provided in an environment in which the plurality of MFPs 100 is used by a plurality of users, for example, in an office of a company. The server 300 includes an on-premises server or a cloud-based server. The networks 401 and 402 include a local area network (LAN) or a global network. The network 404 includes various networks such as a wide area network and the Internet. The mobile terminal 400 can also exchange data with the MFP 100 by short-range wireless communication 403. The information processing apparatus 200 can also be capable of exchanging data with the MFP 100 through the wireless communication 403.

The MFPs 100 are connected to be capable of communicating with each other via the network 401. The information processing apparatus 200 communicates with the MFP 100 in a wired or wireless manner through the networks 401 and 402. In addition, the MFP 100 or the information processing apparatus 200 communicates with the server 300 through the network 404. The information processing apparatus 200 has a configuration corresponding to a computer, and includes at least a memory that stores a program, a processor that executes the program, a communication circuit, an instruction input device, and the like. For example, the information processing apparatus 200 and the mobile terminal 400 have a program of a printer driver 204, and execute the printer driver 204 to generate job information 205 such as a print job to be executed by the MFP 100, and transfer the job information via these networks. The MFP 100 executes the job information 205 received from the network to perform processing (print processing, facsimile processing, and the like) designated by the job.

In the system 1, for each of the MFPs 100, the server 300 manages the latest operation time of the MFP 100, whereby the history of the user operation of each of the MFPs 100 is managed. Here, it is known that a virus attached to the surface of an object, such as an image forming apparatus, is more likely to be inactivated as an elapsed time from attachment increases. The server 300 detects the operation elapsed time based on the latest operation time of each of the MFPs 100, and determines the MFP 100 having the longest operation elapsed time as the MFP 100 recommended to be used, that is, as the recommended MFP 100 recommended as the MFP 100 to be operated by the user. The server 300 notifies the user of information on the recommended MFP 100. As a result, the system 1 can prevent a specific MFP 100 among the plurality of MFPs 100 from being intensively used (operated) in a short period of time.

B. Hardware Configuration

Figure 2:
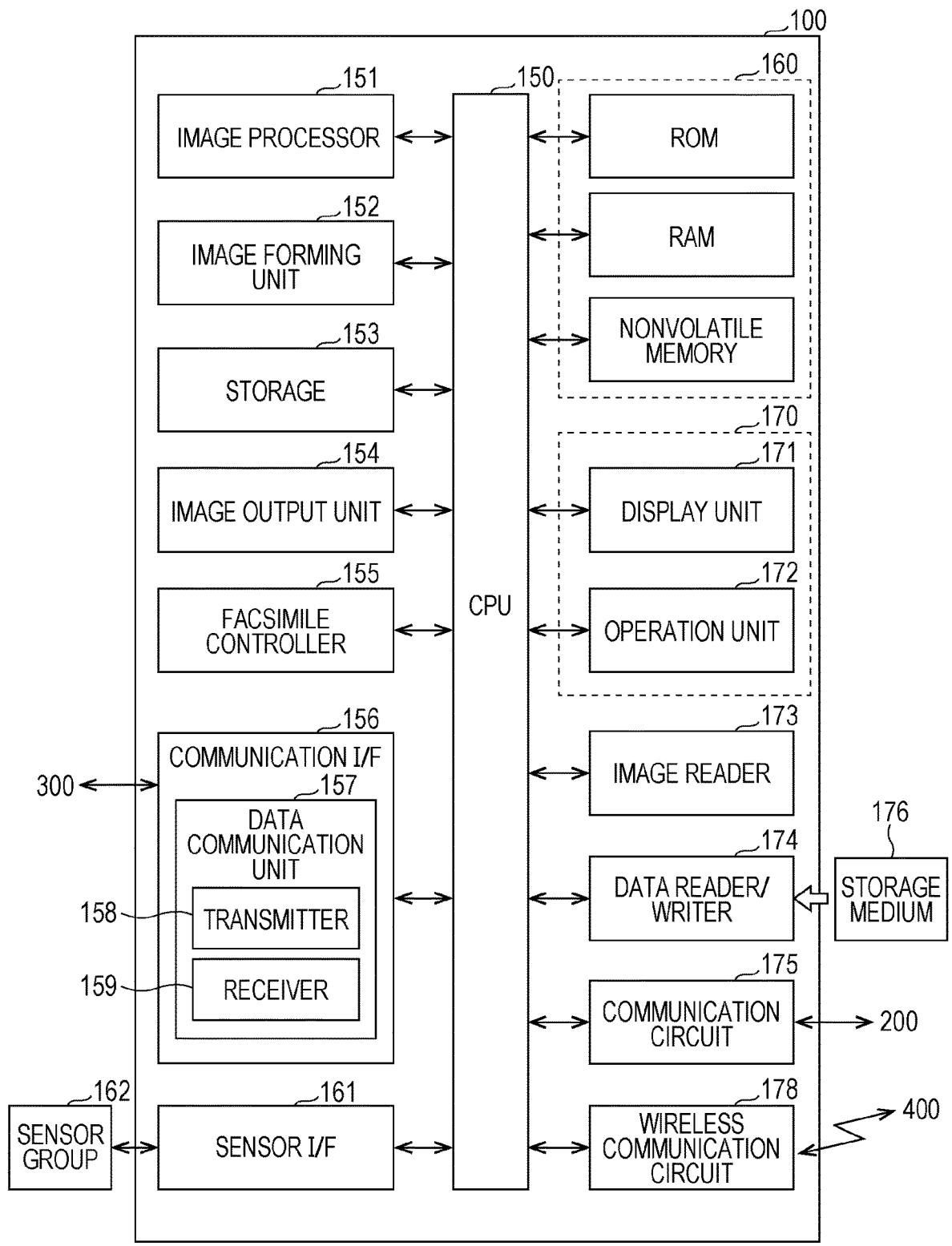
FIG. 2 is a diagram schematically illustrating an example of a hardware configuration of a multi-function peripheral (MFP) according to the present embodiment.

FIG. 2 is a diagram schematically illustrating an example of a hardware configuration of the MFP 100 according to the present embodiment. Referring to FIG. 2, the MFP 100 includes: a central processing unit (CPU) 150 corresponding to a controller for controlling the MFP 100; a storage 160 for storing a program and data; an information input/output unit 170; a communication interface (I/F) 156 for communicating with the server 300; a communication circuit 175 for communicating with the information processing apparatus 200; a wireless communication circuit 178 for short-range wireless communication with a device such as the mobile terminal 400; a sensor interface (I/F) 161 that exchanges data and a signal with a sensor group 162 including various sensors provided in the MFP 100; a data reader/writer 174 to which an external storage medium 176 is detachably attached; and various processors. Details of the sensor group 162 will be described later.

The storage 160 includes a read only memory (ROM) for storing a program and data executed by the CPU 10, a random access memory (RAM) provided as a work area when the program is executed by the CPU 10, a nonvolatile memory, and the like. The RAM also stores various types of data read and written when the program is executed.

The input/output unit 170 includes a display unit 171 including a display and an operation unit 172 such as a key or a switch operated by the user to input information to the MFP 100. Here, the display unit 171 and the operation unit 172 can be provided as an integrally formed touch panel.

The communication I/F 156 includes a circuit such as a network interface card (NIC). The communication I/F 156 includes a data communication unit 157 for communicating with an external device including the server 300 via a network. The data communication unit 157 includes a transmitter 158 for transmitting data to an external device including the server 300 via a network, and a receiver 159 for receiving data from an external device including the server 300 via a network.

The communication circuit 175 includes a communication circuit such as a local area network (LAN) or near field communication (NFC) for communicating with the information processing apparatus 200. The wireless communication circuit 178 includes a communication circuit such as NFC or Bluetooth (registered trademark) For example, the wireless communication circuit 178 performs communication of, for example, a beacon signal with other devices including the mobile terminal 400 according to Bluetooth.

The various processors described above include an image processor 151, an image forming unit 152, a storage 153 including a hard disk for storing and processing various types of data including image data, an image output unit 154 that controls a printer (not illustrated), a facsimile controller 155 for controlling a facsimile circuit (not illustrated), and an image reader 173 that optically reads a document and obtains image data. The CPU 150 executes a job indicated by the job information 205 and outputs a control command according to an execution result to these processors. As a result, each of the processors is controlled in accordance with the job information 205, and the MFP 100 executes processing (print, facsimile, image reading, and the like) in accordance with the job information 205.

The image output unit 154 drives the printer using print data 50, which will be described later, received from the information processing apparatus 200. The data reader/writer 174 includes a circuit that reads a program or data from the attached external storage medium 176 and a circuit that writes data to the external storage medium 176.

Figure 3:
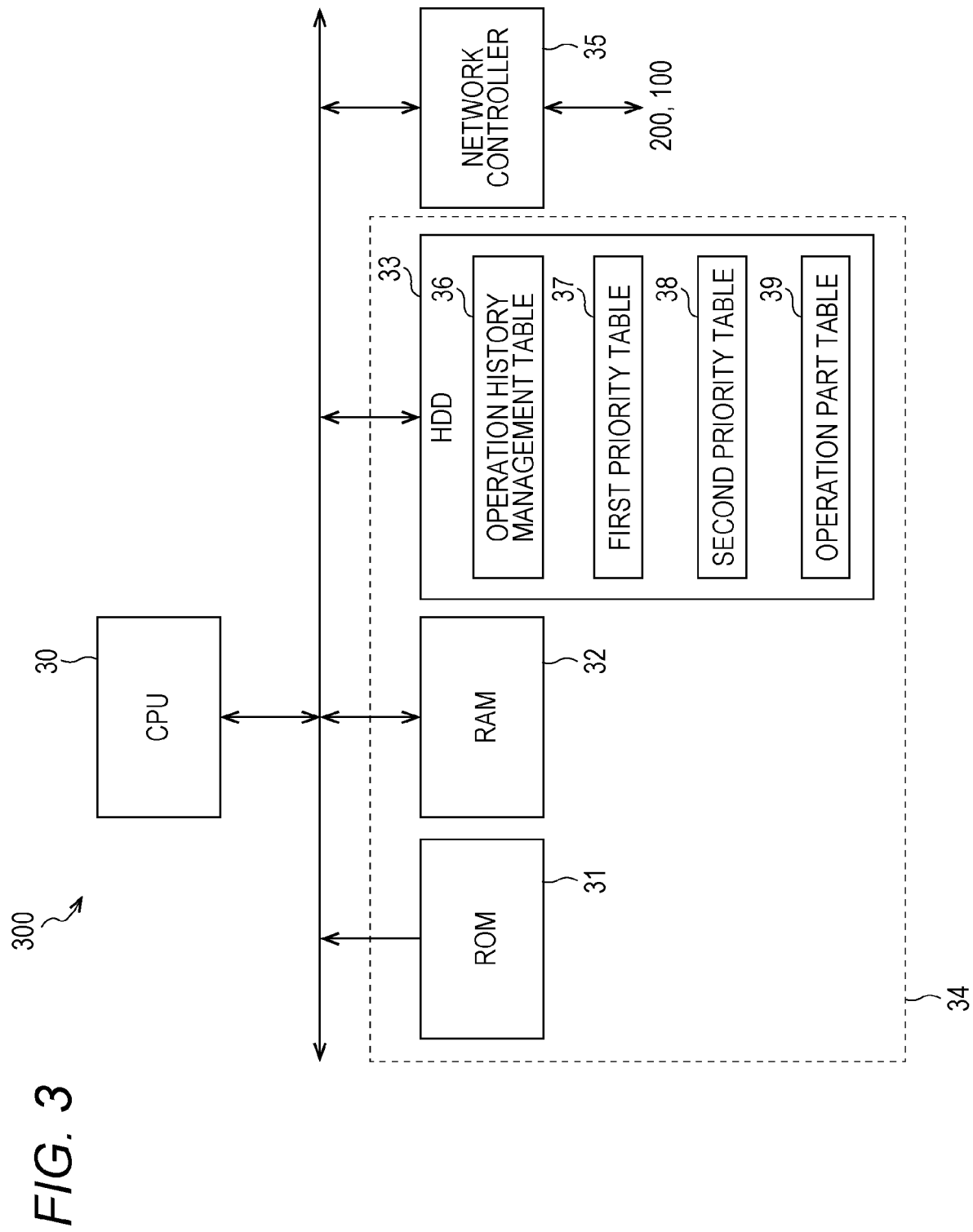
FIG. 3 is a diagram schematically illustrating an example of a hardware configuration of a server according to the present embodiment.

FIG. 3 is a diagram schematically illustrating an example of a hardware configuration of the server 300 according to the present embodiment. Referring to FIG. 3, the server 300 includes: a CPU 30 for controlling the server 300; a storage 34; and a network controller 35 that communicates with the MFP 100 or the information processing apparatus 200. The storage 34 includes a ROM 31 for storing a program and data executed by the CPU 30, a RAM 32, and a hard disk drive (HDD) 33 for storing various types of information. The RAM 32 includes an area for storing various types of information and a work area when the CPU 30 executes the program. The information stored in the HDD 33 includes an operation history management table 36, a first priority table 37, a second priority table 38, and an operation part table 39 in order to manage an operation history of each of the MFPs 100. Details of these tables will be described later. The network controller 35 includes a circuit such as an NIC.

Figure 4:
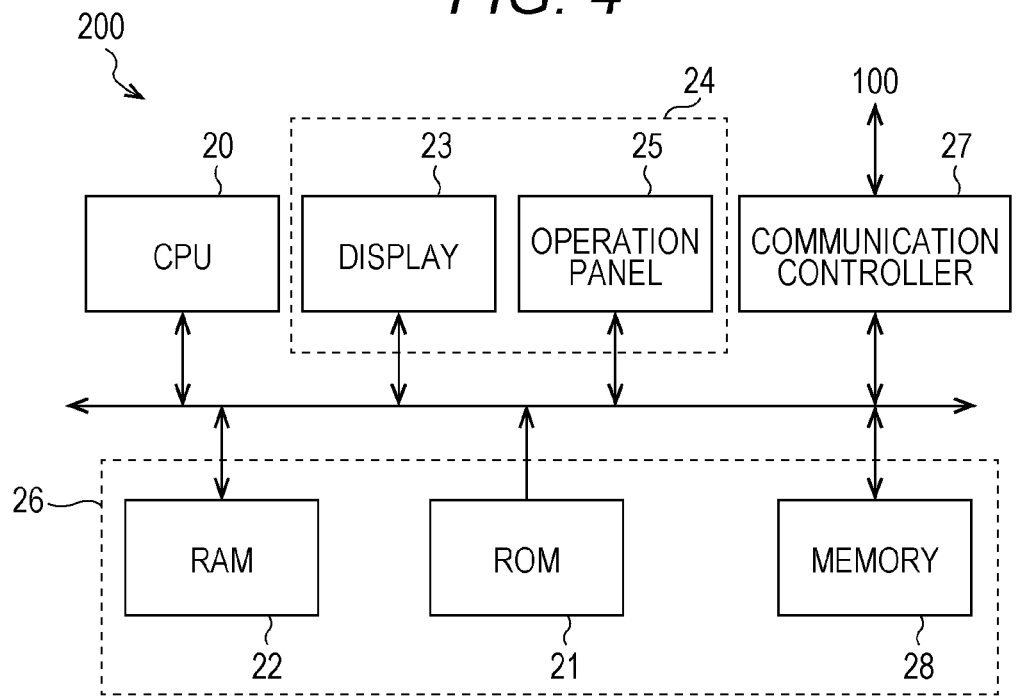
FIG. 4 is a diagram schematically illustrating an example of a hardware configuration of an information processing apparatus according to the present embodiment.

FIG. 4 is a diagram schematically illustrating an example of a hardware configuration of the information processing apparatus 200 according to the present embodiment. Referring to FIG. 4, the information processing apparatus 200 includes: a CPU 20 corresponding to a controller for controlling the information processing apparatus 200; a display 23; an operation panel 25 operated by the user to input information to the information processing apparatus 200; a storage 26; and a communication controller 27. The storage 26 includes a ROM 21 for storing a program and data executed by the CPU 20, a RAM 22, and a memory 28 including a hard disk device. The display 23 and the operation panel 25 may be provided as an integrally formed touch panel. The communication controller 27 includes a communication circuit such as an NIC or a LAN circuit for communicating with another information processing apparatus 200, the MFP 100, or the server 300.

Figure 5:
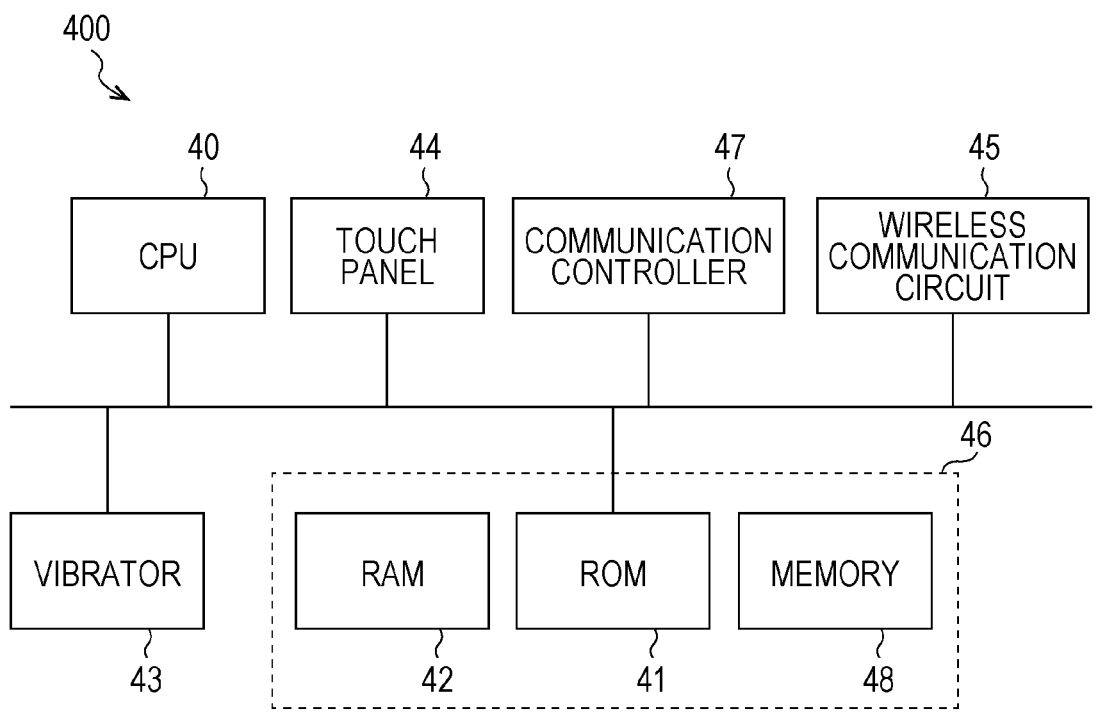
FIG. 5 is a diagram schematically illustrating an example of a hardware configuration of a mobile terminal according to the present embodiment.

FIG. 5 is a diagram schematically illustrating an example of a hardware configuration of the mobile terminal 400 according to the present embodiment. Referring to FIG. 5, the mobile terminal 400 includes: a CPU 40 corresponding to a controller for controlling the mobile terminal 400; a vibrator 43; a touch panel 44 in which a display and a touch pad are integrated; a wireless communication circuit 45; a storage 46; and a communication controller 47. The storage 46 includes a ROM 41 for storing a program and data executed by the CPU 40, a RAM 42, and a memory 48 including a hard disk device. The communication controller 47 includes a communication circuit such as an NIC or a LAN circuit for communicating with another information processing apparatus 200, the MFP 100, or the server 300. The wireless communication circuit 45 includes a communication circuit such as NFC or Bluetooth (registered trademark). For example, the wireless communication circuit 45 communicates with other devices including the MFP 100 according to Bluetooth.

C. Configuration of Job Information

Figure 6:
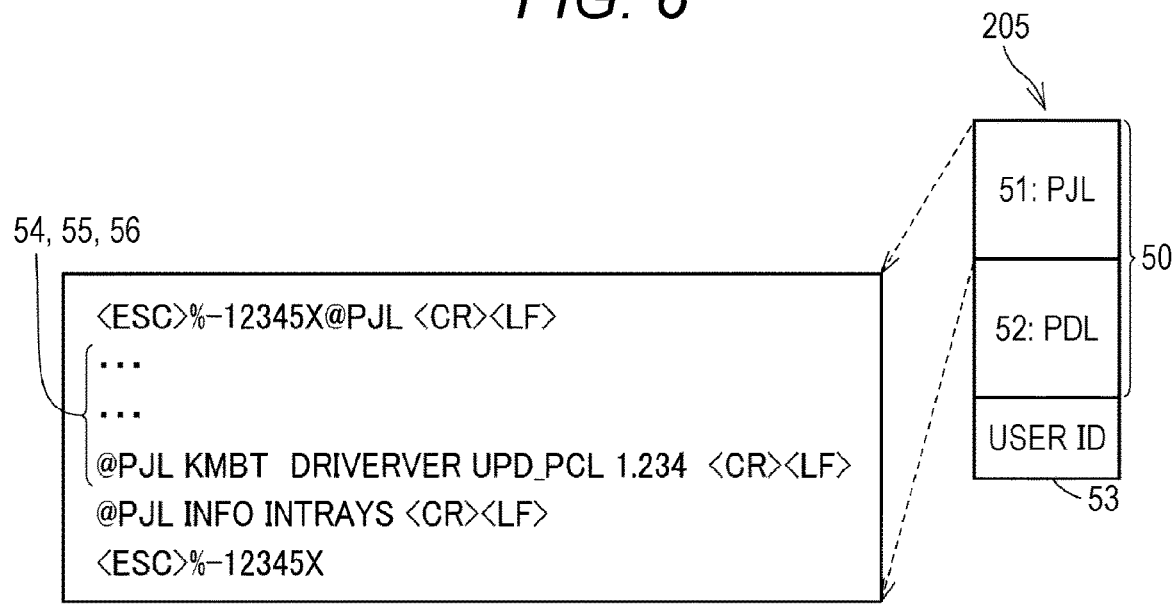
FIG. 6 is a view schematically illustrating a configuration of job information according to the present embodiment.

FIG. 6 is a view schematically illustrating a configuration of job information according to the present embodiment. For example, a print job will be described as the job information 205. The printer driver 204 generates the job information 205 of the print job.

Referring to FIG. 6, the job information 205 includes print data 50 for causing the printer to print an image and a user ID 53 for identifying a user of the job. The print data 50 includes printer job language (PJL) data 51 and page description language (PDL) data 52. The PJL data 51 is command data described in a PJL format. This data to be printed may include data created by the information processing apparatus 200 using an application (for example, word processing software which is a document editing application, spreadsheet software, or the like). The user ID 53 may be any data that can identify the user, and includes, for example, a login name of the user with respect to the information processing apparatus 200. In a case where the job information 205 is generated by the mobile terminal 400, the user ID 53 includes an internet protocol (IP) address, a media access control (MAC) address, and the like of the mobile terminal 400. The user ID 53 can also include a user type 531 to be described later. The user type 531 indicates whether the user is a service person or a general user other than the service person.

Referring to FIG. 6, various commands that do not directly affect the PDL data 52 are defined in the PJL data 51. For example, in a case where a function such as stapling or punching is used, command data 54 related to the function, command data 55 designating a tray (a sheet feed tray, an output tray serving as a discharge destination, a manual feed tray, or the like), command data 56 related to a function of an auto document feeder (ADF), and the like are described. Note that types of commands described in the PJL data 51 are not limited thereto.

The MFP 100 processes the job information 205. Specifically, the image output unit 154 of the MFP 100 develops the PDL data 52 of the print data 50 as bitmap data on the RAM of the storage 160 using firmware. The printer (not illustrated) of the image output unit 154 executes printing processing on a print sheet according to the bitmap data (the PDL data 52), and executes predetermined processing (stapling, designation of a tray (sheet feed tray or sheet discharge tray), start of ADF, or the like) on the print sheet or the like according to the PJL data 51.

Here, the configuration of the print job has been described as the job information 205, but a configuration similar to that of the print job can be applied to other types of jobs, and thus, the description will not be repeated.

D. Functional Configuration of Each Apparatus

Figure 7:
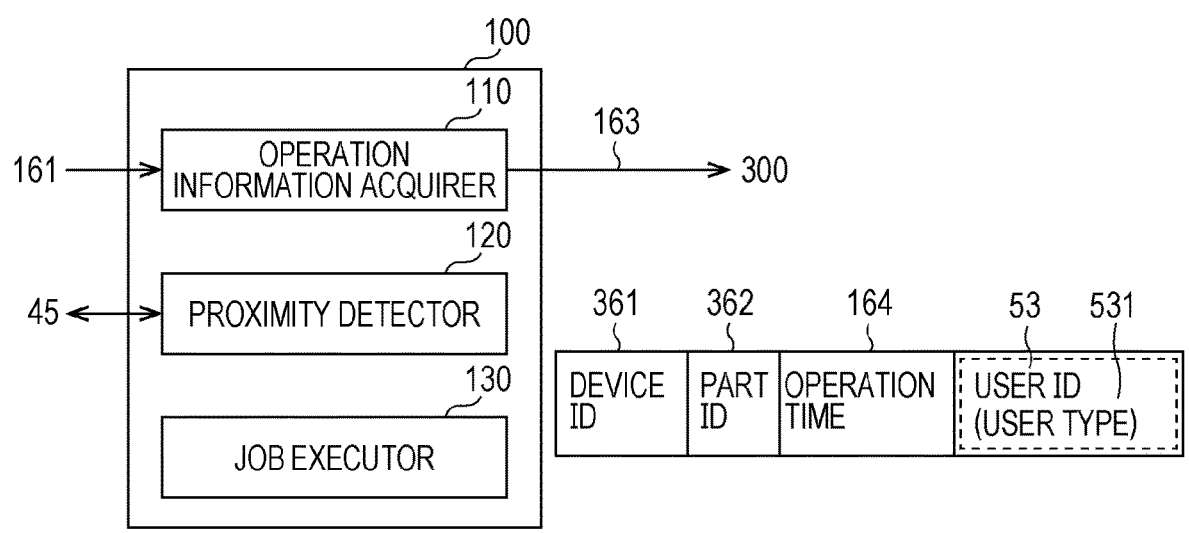
FIG. 7 is a diagram schematically illustrating an example of a functional configuration of the MFP according to the present embodiment.

FIG. 7 is a diagram schematically illustrating an example of a functional configuration of the MFP 100 according to the present embodiment. Referring to FIG. 7, the MFP 100 includes an operation information acquirer 110, a proximity detector 120, and a job executor 130. The operation information acquirer 110 receives an output (sensor data) from the sensor I/F 161, and generates operation information 163 based on the received sensor data. The MFP 100 transfers the generated operation information 163 to the server 300. The proximity detector 120 detects that the user (the mobile terminal 400) approaches the MFP 100 based on data exchanged with the mobile terminal 400 using the wireless communication circuit 178, and receives the user ID 53 from the mobile terminal 400. The job executor 130 executes a job indicated by the job information 205 received by the MFP 100. The respective parts in FIG. 7 are implemented by a program executed by the CPU 150 or a combination of the program and a circuit. Details of the operation information 163 will be described later.

Figure 8:
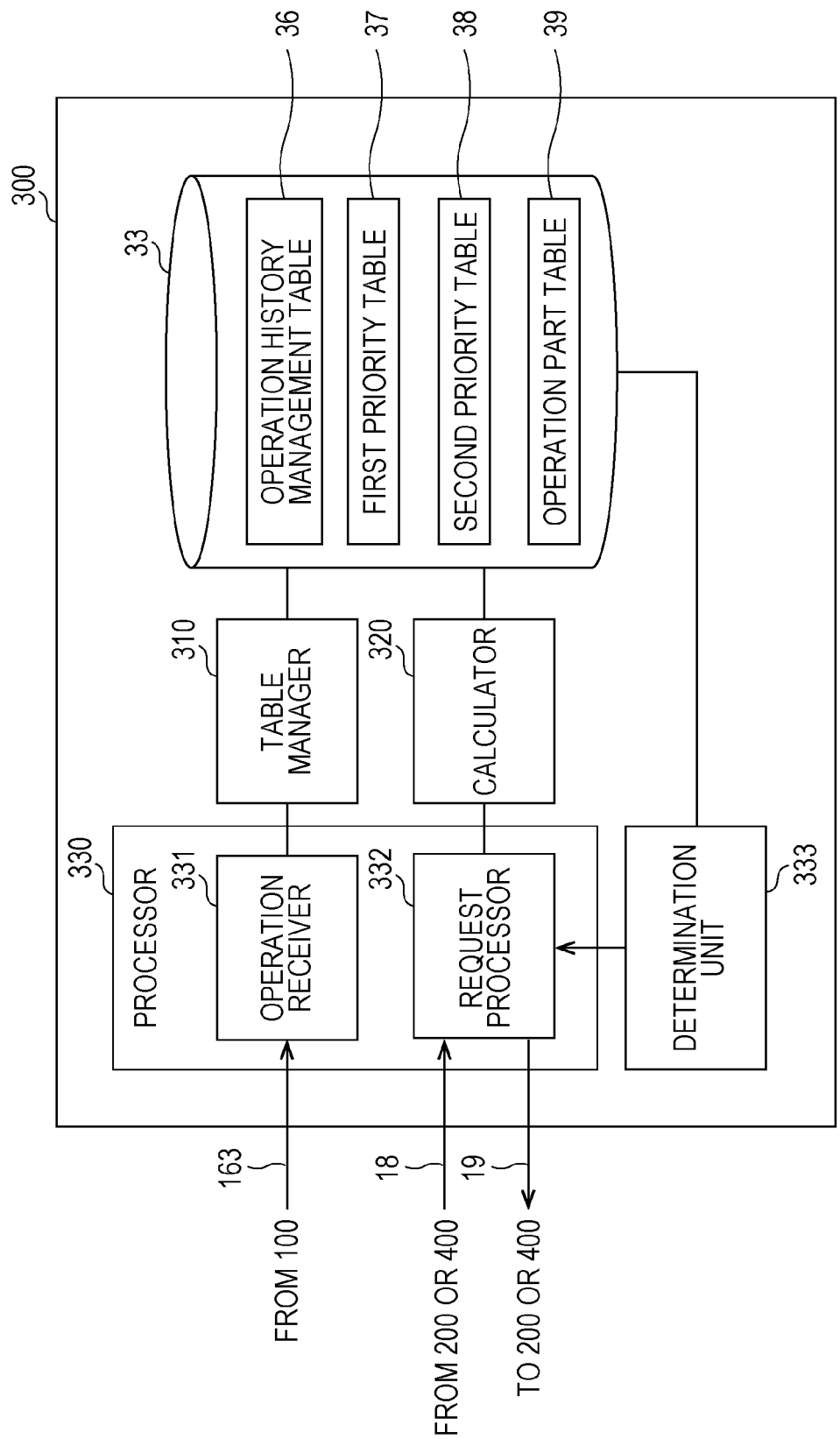
FIG. 8 is a diagram schematically illustrating an example of a functional configuration of the server according to the present embodiment.

FIG. 8 is a diagram schematically illustrating an example of a functional configuration of the server 300 according to the present embodiment. The server 300 stores various types of information including the operation history management table 36, the first priority table 37, the second priority table 38, and the operation part table 39 in the HDD 33. In addition, the server 300 includes a table manager 310 that manages the tables stored in the HDD 33, a calculator 320 that calculates a priority described later, a processor 330, and a determination unit 333 that acquires determination information 19 to be described later. The processor 330 includes an operation receiver 331 that receives the operation information 163 transferred from the MFP 100, and a request processor 332 that receives a request 18 transferred from the information processing apparatus 200 or the mobile terminal 400 and transfers the determination information 19 to a requester as a response. The determination information 19 acquired by the determination unit 333 includes information on the recommended MFP 100 to be described later. A notification including the determination information 19 acquired by the determination unit 333 is transmitted to the information processing apparatus 200 or the mobile terminal 400 by the network controller 35 which is an example of a unit outputting the notification. This unit outputting this notification and the respective units in FIG. 8 are implemented by a program executed by the CPU 30 or a combination of the program and a circuit. The request 18 can include a job execution request to be executed by the MFP 100.

Figure 9:
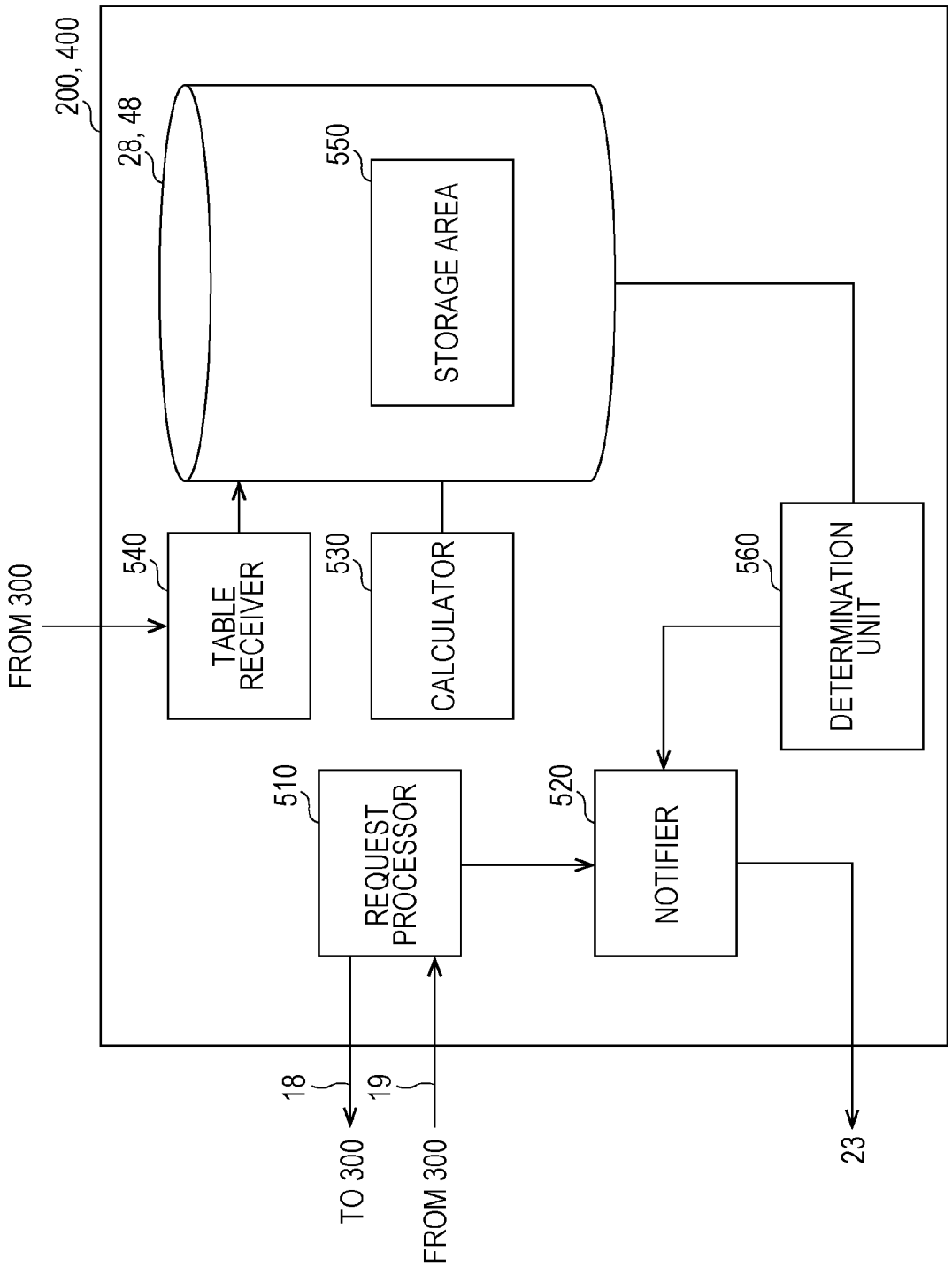
FIG. 9 is a diagram schematically illustrating an example of a functional configuration of the information processing apparatus according to the present embodiment.

FIG. 9 is a diagram schematically illustrating an example of a functional configuration of the information processing apparatus 200 according to the present embodiment. The mobile terminal 400 also has a functional configuration similar to that in FIG. 9, but the information processing apparatus 200 will be described in FIG. 9. Referring to FIG. 9, the information processing apparatus 200 includes a storage area 550 for storing the operation history management table 36, the first priority table 37, and the second priority table 38 transferred from the server 300 in the memory 28. In the case of the mobile terminal 400, the storage area 550 is provided in the memory 48.

The information processing apparatus 200 includes: a table receiver 540 that receives the operation history management table 36, the first priority table 37, and the second priority table 38 transferred from the server 300 and stores the tables in the storage area 550 of the memory 28; a calculator 530 that calculates a priority, which will be described later, based on the information of the table stored in the storage area 550; a determination unit 560 that generates the determination information 19 based on the information of the first priority table 37 and the second priority table 38 of the storage area 550; a notifier 520 that causes the display 23 to display a notification based on the determination information 19; and a request processor 510. The request processor 510 transfers the request 18 to the server 300, and receives the determination information 19 as the response transferred from the server 300. The request processor 510 outputs the determination information 19 to the notifier 520. The respective units in FIG. 9 are implemented by a program executed by the CPU 20 (or the CPU 40) or a combination of the program and a circuit.

E. Sensor and User Operation

Figure 10:
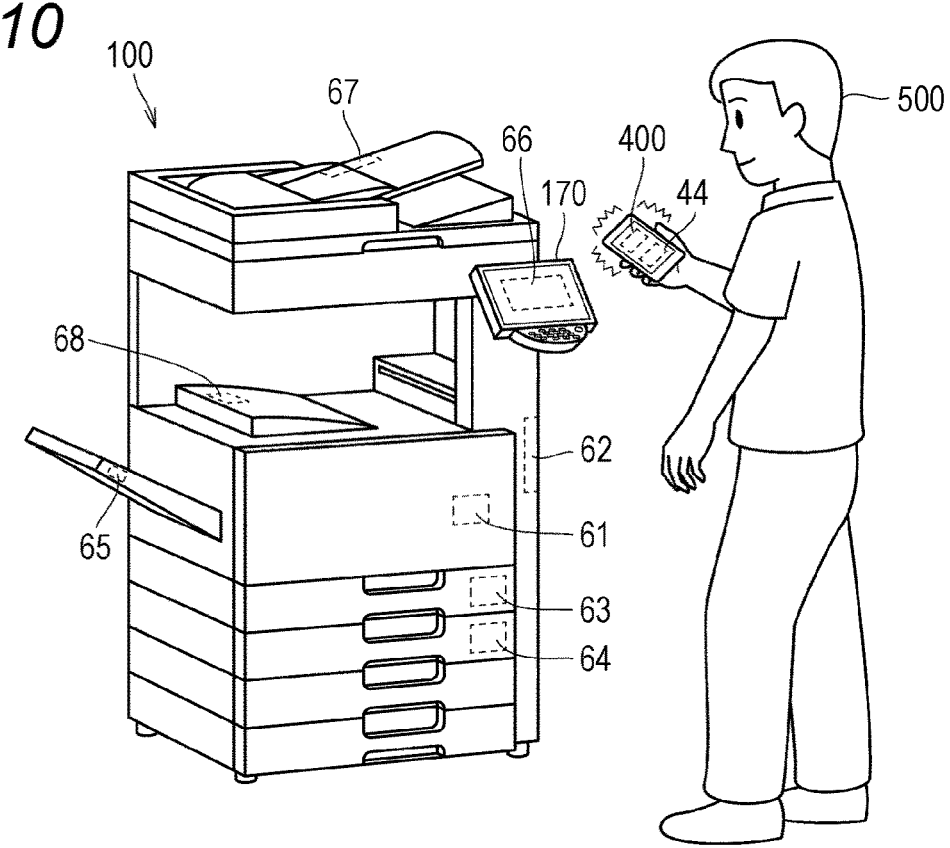
FIG. 10 is a view schematically illustrating an example of a user operation on the MFP according to the present embodiment.
Figure 11:
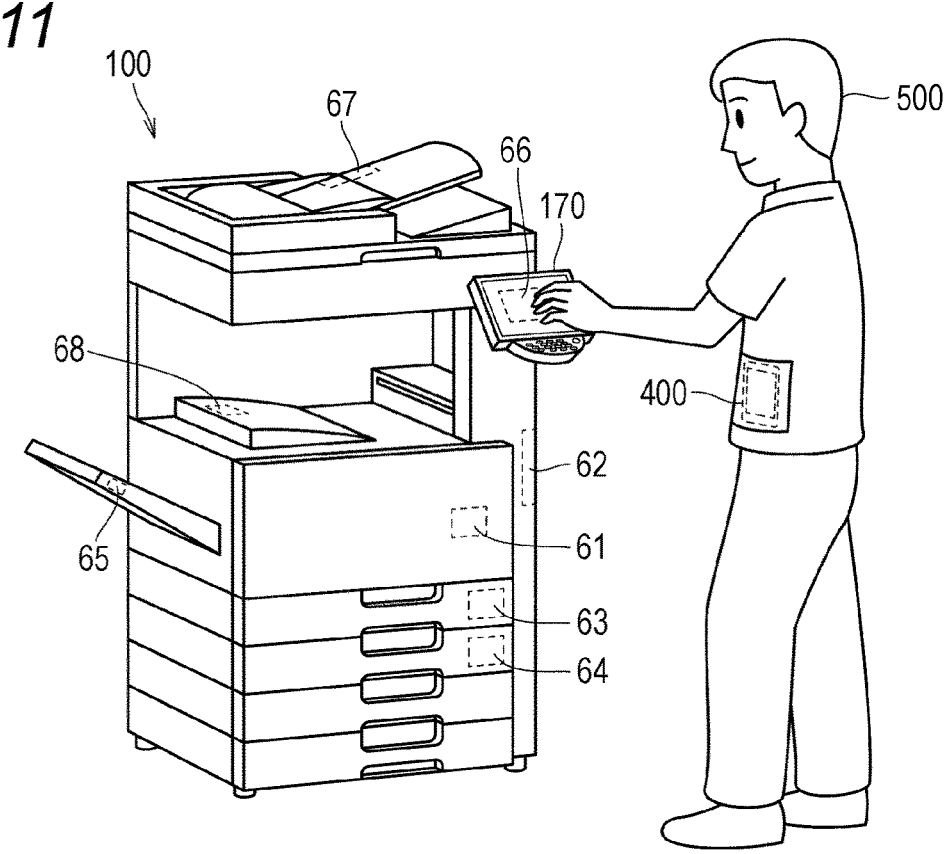
FIG. 11 is a view schematically illustrating an example of the user operation on the MFP according to the present embodiment.

FIGS. 10 and 11 are views schematically illustrating examples of the user operation on the MFP 100 according to the present embodiment. The examples of the user operation on the MFP 100 and an attachment position of the sensor group 162 of the MFP 100 will be described with reference to FIGS. 10 and 11.

Referring to FIG. 10, the sensor group 162 of the MFP 100 includes sensors 61 to 68 provided in a plurality of parts of the MFP 100 that can be operated by the user. More specifically, the sensors 61 and 62 are provided on a front door and a rear door of the MFP 100, respectively, the sensors 63 and 64 are provided on a tray 1 and a tray 2 which are the sheet feed trays of the MFP 100, respectively, the sensor 65 is provided on the manual feed tray, the sensor 66 is provided on a touch panel of the input/output unit 170, and the sensors 67 and 68 are provided on the output tray and the ADF, respectively. Each of the sensors of the sensor group 162 is capable of detecting an operation on a part where the sensor is provided, and includes, for example, a contact sensor or a non-contact sensor such as a proximity switch, but the type of the sensor is not limited thereto.

FIG. 10 illustrates a state in which a user 500 having the mobile terminal 400 approaches the MFP 100. In the present embodiment, the MFP 100 performs wireless communication with the mobile terminal 400 using the beacon signal or the like to detect that the user has approached the MFP 100. When the MFP 100 detects the approach of the user 500, the CPU 40 of the mobile terminal 400 drives the vibrator 43 based on communication with the MFP 100. Vibrations of the vibrator 43 are transmitted to a body of the user 500 holding the mobile terminal 400. As a result, the user 500 can receive the notification of approach to the MFP 100 by the vibrations.

(e1. Acquisition of Operation Information and User Information)

FIG. 11 illustrates, for example, a state in which the user 500 operates the touch panel of the input/output unit 170 of the MFP 100. In FIG. 11, the sensor 66 detects the user operation on the touch panel and outputs a detection signal. The sensor I/F 161 acquires an identifier of the sensor based on the detection signal output from the sensor 66, and acquires an operation time 164 which is the detected time. The sensor I/F 161 converts the acquired identifier of the sensor into a part ID 362 for identifying a part where the sensor is provided. In this manner, when receiving the detection signal from each of the sensors of the sensor group 162, the sensor I/F 161 outputs sensor data including the part ID 362 and the operation time 164. An operated part (the front door, the rear door, the tray 1, the tray 2, the manual feed tray, the touch panel, the output tray, or the ADF) of the MFP 100 is identified by the part ID 362. Although the openable and closable front and rear doors, the touch panel, the sheet feed trays (the tray 1, the tray 2, and the manual feed tray), the sheet discharge tray (output tray), and the ADF (automatic document feeding unit) have been exemplified as the parts to be operated by the user in accordance with the execution of the job in the MFP 100, the part is not limited thereto. In addition, when a job is executed, one or more of these parts are operated by the user, and the types and number of parts to be operated differ depending on a type of job.

The CPU 150 of the MFP 100 generates the operation information 163 in which a device ID 361, which is an identifier of the own apparatus, is added to the sensor data output from the sensor I/F 161 as the operation information acquirer 110. The operation information 163 further includes the user ID 53 for identifying the user of the detected user operation. The user ID 53 may include the user type 531.

The CPU 150 of the MFP 100 acquires the user ID 53 from the job information 205 as the operation information acquirer 110. When detecting the user operation, the CPU 150 receives the user ID 53 from the mobile terminal 400 of the user in proximity to the MFP 100 by wireless communication as the proximity detector 120. As a result, the user who has performed the operation is identified by the user ID 53 included in the operation information 163. A configuration example of the operation information 163 is illustrated in FIG. 7.

F. Configurations of Tables

Configurations of the tables according to the present embodiment will be described with reference to FIGS. 12 to 15. The CPU 30 of the server 300 manages these tables as the table manager 310. FIG. 12 is a view schematically illustrating the configuration of the operation history management table 36 according to the present embodiment. Referring to FIG. 12, for each of the MFPs 100, the operation history management table 36 stores (registers) a latest operation time 364 for each of the parts (the front door, the rear door, the tray 1, the tray 2, the manual feed tray, the touch panel, the output tray, and the ADF) of the MFP 100, and the user ID 53 of the user in association with the latest operation time 364. Although the user ID 53 associated with one latest operation time 364 is illustrated in the operation history management table 36 of FIG. 12, the user IDs 53 are stored (registered) respectively for all the latest operation times 364 in the operation history management table 36 in practice. In the operation history management table 36, each of the MFPs 100 is identified by the device ID 361, and a part is identified by the part ID 362.

More specifically, when receiving the operation information 163 from the MFP 100, the CPU 30 searches the operation history management table 36 based on the device ID 361 of the received operation information 163. The CPU 30 identifies the part ID 362 that matches a part ID indicated by the received operation information 163 among the part IDs 362 corresponding to the device ID 361 identified by the search, and rewrites the latest operation time 364 corresponding to the identified part ID 362 to the latest operation time indicated by the operation information 163. In addition, the user ID 53 associated with this latest operation time 364 is rewritten to a user ID of the received operation information 163. In this manner, every time the CPU 30 receives the operation information 163 from the MFP 100, the latest operation time 364 and the user ID 53 corresponding to each part of the MFP 100 in the operation history management table 36 can be updated to the latest information based on the received operation information 163.

In addition, as the table manager 310, the CPU 30 calculates an operation elapsed time for each of the latest operation times 364 of the operation history management table 36, compares the calculated operation elapsed time with a predetermined time, and deletes (invalidates) the latest operation time 364 when determining that the operation elapsed time exceeds the predetermined time as a result of the comparison. In FIG. 12, for example, the deletion of the latest operation time 364 is indicated by a symbol "—".

FIG. 13 is a view schematically illustrating the configuration of the first priority table 37 according to the present embodiment. Referring to FIG. 13, for each of the MFPs 100, a priority 365 is stored (registered) for each of the parts (the front door, the rear door, the tray 1, the tray 2, the manual feed tray, the touch panel, the output tray, and the ADF) of the MFP 100 in the first priority table 37. In the first priority table 37, each of the MFPs 100 is identified by the device ID 361, and a part is identified by the part ID 362.

The priority 365 corresponding to the part ID 362 is a value calculated based on the latest operation time 364 of the operation history management table 36. For each of the part IDs 362, the priority 365 indicates the degree of recommendation of a part of a certain MFP 100 as an operation target in preference to the parts of the other MFPs 100. In the present embodiment, the priority 365 becomes higher as the elapsed time from the latest operation time 364 is longer, and the priority 365 becomes lower as the latest operation time 364 is closer to the current time, that is, the elapsed time from the latest operation time 364 is shorter. In the present embodiment, the priority 365 is set to 1, 2, 3, and so on in descending order.

For example, a case where the "tray 1" is exemplified as a part and the current time is 13:00 will be described. In this case, in the operation history management table 36, the latest operation time 364 corresponding to the part "front door" is indicated as 10:30 for the MFP (A), 11:30 for the MFP (B), and 12:30 for the MFP (C). Therefore, the elapsed time from the latest operation time 364 to the current time (13:00) for each of the MFPs 100 is long in the order of the MFP (A), the MFP (B), and the MFP (C). Therefore, the priority 365 of the "tray 1" is set such that the MFP (A) has the highest priority (priority=1), the MFP (B) has the next highest priority (priority=2), and the MFP (C) has the lowest priority (priority=3) as illustrated in FIG. 13. Although the "tray 1" has been described here, the priority 365 is similarly set for other parts.

Figure 14:
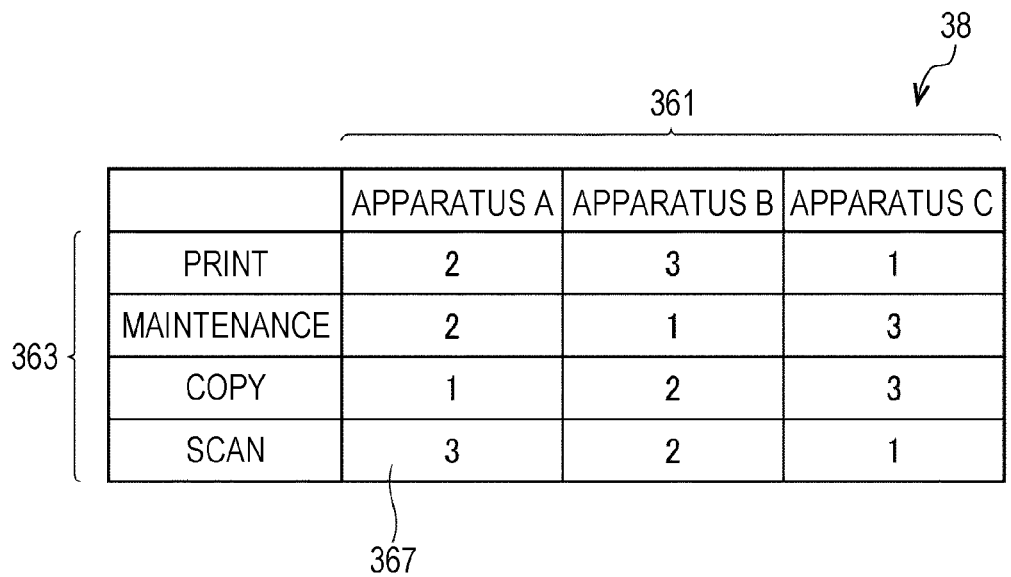
FIG. 14 is a view schematically illustrating a configuration of a second priority table according to the present embodiment.

FIG. 14 is a view schematically illustrating the configuration of the second priority table 38 according to the present embodiment. Referring to FIG. 14, for each of the MFPs 100, a priority 367 is stored (registered) for each of job types 363 which are types of jobs executed by the MFP 100 in the second priority table 38. In the second priority table 38, each of the MFPs 100 is identified by the device ID 361 and is identified by the job type 363 of a job. FIG. 14 illustrates maintenance performed by the service person while operating the MFP 100, and print, copy, and scan performed by a general user other than the service person while operating the MFP 100 as the job types 363, but the job types are not limited thereto.

Figure 15:
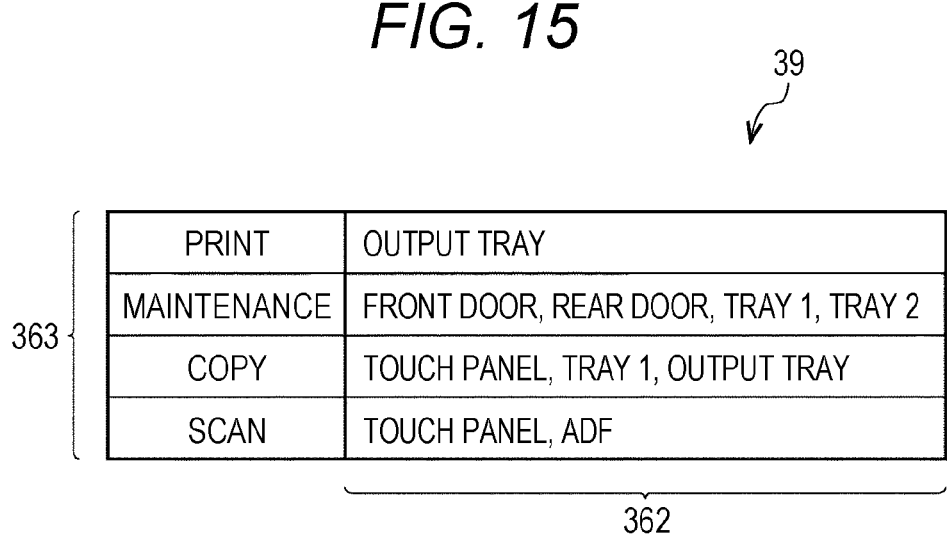
FIG. 15 is a view schematically illustrating a configuration of an operation part table according to the present embodiment.

FIG. 15 is a view schematically illustrating the configuration of the operation part table 39 according to the present embodiment. Referring to FIG. 15, one or more part IDs 362 are stored (registered) in the operation part table 39 for each of the job types 363. The one or more part IDs 362 corresponding to each job type in the operation part table 39 indicate an identifier of each of one or more parts to be operated (likely to be operated) by the user when the job is executed.

In the second priority table 38 of FIG. 14, the priority 367 of a certain job type 363 of each of the MFPs 100 indicates the degree to which the MFP 100 is recommended as a device to be used (operated) for executing the job in preference to the other MFPs 100.

More specifically, the priority 367 of the job type 363 is calculated based on the priority 365 of the part operated by the user when the job is executed. For example, in a case where "scan" is performed as a job, the CPU 30 of the server 300 searches the operation part table 39 for the "touch panel" and the "ADF" as the part IDs 362 based on the job type "scan" as the table manager 310. The CPU 30 searches the first priority table 37 in FIG. 13 for the priority 365 based on the part IDs "touch panel" and "ADF". The searched priority 365 of the "touch panel" indicates "2" for the MFP (A), "3" for the MFP (B), and "1" for the MFP (C), and the searched priority 365 of the "ADF" indicates "3" for the MFP (A), "1" for the MFP (B), and "2" for the MFP (C). The CPU 30 integrates values indicated by the priorities 365 of the "touch panel" and the "ADF" for each of the MFPs 100, and stores (registers) the integrated value of each of the MFPs 100 in the second priority table 38 as the priority 367. In this case, the integrated value is calculated as "5" for the MFP (A), "4" for the MFP (B), and "3" for the MFP (C), and thus, the priority 367 is set based on the integrated values as "3" for the MFP (A), "2" for the MFP (B), and "1" for the MFP (C). Therefore, the priority 367 of the "scan" job is set such that the MFP (C) has the highest priority (priority=1), the MFP (B) has the next highest priority (priority=2), and the MFP (A) has the lowest priority (priority=3) as illustrated in FIG. 14.

Although "scan" is indicated as the job type 363 here, the CPU 30 can calculate the priority 367 by a similar method even for other types of jobs.

In the present embodiment, the CPU 30 updates the operation history management table 36 every time the operation information 163 is received from the MFP 100. As described above, the CPU 30 calculates the priority 365 based on the latest operation time 364 as the calculator 320 and sets the calculated priority in the first priority table 37. In addition, the priority 367 of the second priority table 38 is calculated. As described above, the CPU 30 calculates the priority 367 based on the priority 365 in the first priority table 37 as the calculator 320 and sets the calculated priority in the second priority table 38. The CPU 30 may calculate the priority 365 and the priority 367 of the first priority table 37 and the second priority table 38 as the calculator 320 every time the latest operation time 364 of the operation history management table 36 is updated.

G. Processing Flow

FIGS. 16 to 20 are flowcharts of a process of managing the user operation of the MFP 100 according to the present embodiment. The process will be described with reference to FIGS. 16 to 20.

(g1. Processing of Operation Information 163)

Figure 16:
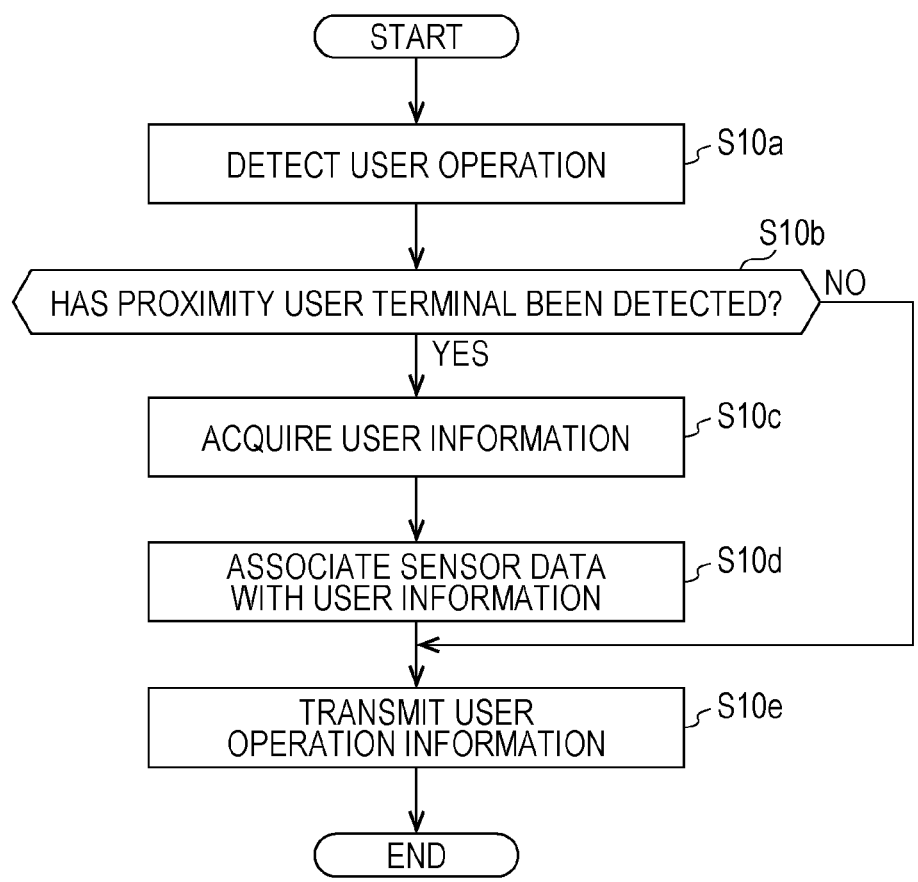
FIG. 16 is a flowchart of a process of managing the user operation on the MFP according to the present embodiment.
Figure 17:
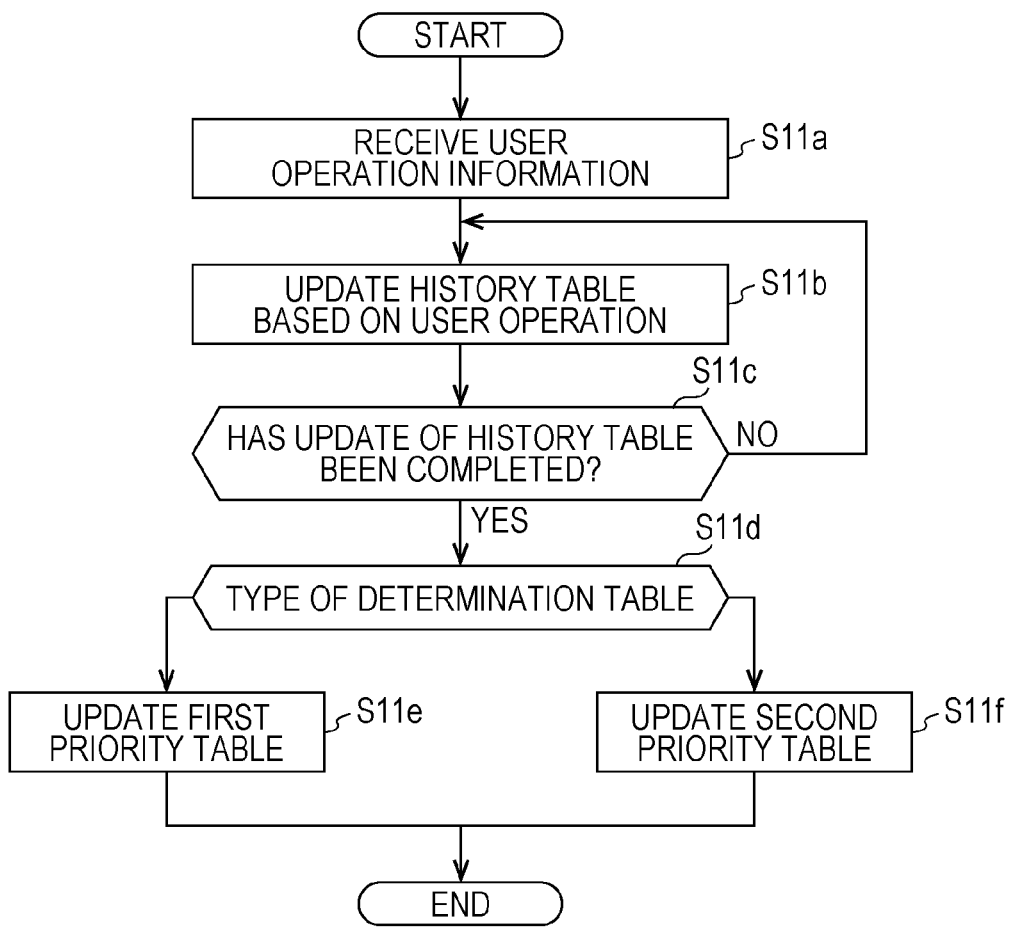
FIG. 17 is a flowchart of the process of managing the user operation on the MFP according to the present embodiment.

Referring to FIG. 16, the CPU 150 of the MFP 100 acquires the operation information 163 as the operation information acquirer 110, and transmits the operation information 163 to the server 300. More specifically, the CPU 150 detects the user operation on the MFP 100 from the sensor data output from the sensor I/F 161 (step S10a). In addition, the CPU 150 determines whether a user terminal in proximity has been detected based on wireless communication as the proximity detector 120 (step S10b). When the user terminal in proximity has been detected (YES in step S10b), the CPU 150 receives (acquires) user information, that is, the user ID 53 from, for example, the mobile terminal 400 which is the user terminal in proximity (step S10c). The CPU 150 associates the user ID 53 with the sensor data to generate the operation information 163 (step S10d). When any user terminal in proximity is not detected (NO in step S10b), the CPU 150 generates the operation information 163 from the sensor data. The CPU 150 transmits the generated operation information 163 to the server 300 (step S10e). As a result, when the user operation on the MFP 100 is detected, the MFP 100 can acquire the user ID 53 of the user in proximity to the MFP 100, that is, the user who can operate the MFP 100.

(g2. Processing of Operation History Management Table 36)

Referring to FIG. 16, the CPU 30 of the server 300 receives the operation information 163 from the MFP 100 (step S11a). As the table manager 310, the CPU 30 updates the operation history management table 36 based on the operation information 163 (step S11b). More specifically, the CPU 30 searches the operation history management table 36 based on the device ID 361 and the part ID 362 indicated by the operation information 163, and rewrites the latest operation time 364 corresponding to the device ID 361 and the part ID 362 identified based on the search result so as to indicate the operation time 164 of the operation information 163.

The CPU 30 determines whether the update of the operation history management table 36 has ended based on the operation information 163 (step S11c). For example, when the user operation is detected in a plurality of parts in the MFP 100, the operation information 163 includes a plurality of the part IDs 362. In this case, the CPU 30 rewrites all the part IDs 362 included in the operation information 163 such that the corresponding latest operation times 364 in the operation history management table 36 indicate the operation times 164. When the rewriting is completed, the CPU 30 determines that the update of the operation history management table 36 has been completed (YES in step S11c) and proceeds to step S11d, but returns to step S11b when determining that the rewriting has not been completed and the update of the operation history management table 36 has not been completed (NO in step S11c).

When the latest operation time 364 of the operation history management table 36 is updated, the CPU 30 calculates the above-described priorities as the calculator 320, and sets the calculated priorities in the first priority table 37 and the second priority table 38 to update these tables (step S11d, step S11e, and step S11f). That is, the CPU 30 recalculates the priority 365 of the first priority table 37 based on the updated latest operation time 364 in the operation history management table 36, and recalculates the priority 367 of the second priority table 38 based on the recalculated priority 365 of the first priority table 37.

(g3. Processing of Determination Information 19)

Processing in which the server 300 transmits the determination information 19 in response to the request 18 from the information processing apparatus 200 or the mobile terminal 400 will be described with reference to FIG. 18. Here, the determination information 19 is information for designating the recommended MFP 100, and includes, for example, information of the second priority table 38 in FIG. 14 or the device ID 361 of the recommended MFP 100.

First, the CPU 30 of the server 300 receives the request 18 from the information processing apparatus 200 or the mobile terminal 400 (step S12a). The request 18 may include user information (the user ID 53 and the user type 531 (a general user or a service person)).

The CPU 30 determines whether the request 18 includes the user information as the request processor 332 (step S12b). When it is determined that the user information is not included (NO in step S12b), the processing proceeds to step S12h. On the other hand, when it is determined that the request 18 includes the user information (YES in step S12b), the CPU 30 acquires the user type 531 from the user information (step S12c), and identifies a part that is likely to be operated by the user as the determination unit 333 (step S12d).

More specifically, when the user type 531 indicates the "service person", the CPU 30 searches the operation part table 39, and identifies one or more part IDs 362 corresponding to the job type 363 of "maintenance" based on the search result. According to the operation part table 39 of FIG. 15, the "front door", the "rear door", the "tray 1", and the "tray 2" are identified as the one or more part IDs 362. In addition, when the user type 531 indicates the "general user", the CPU 30 searches the operation part table 39, and identifies one or more part IDs 362 corresponding to "print", "copy", and "scan", which are jobs having the job types 363 other than "maintenance" based on a result of the search. According to the operation part table 39 of FIG. 15, the "output tray", the "touch panel", the "tray 1", and the "ADF" are identified as the one or more part IDs 362.

The CPU 30 determines whether the processing of the determination information 19 is executed by the server 300 or executed by an apparatus that is a transmission source of the request 18, that is, the information processing apparatus 200 or the mobile terminal 400 based on mode information (step S12e). The mode information is information designating a device that executes the processing of the determination information 19. The mode information may be preset in the server 300, or may be included in the request 18.

The CPU 30 proceeds to step S12h when determining that the processing of the determination information 19 is executed by the transmission source apparatus (NO in step S12e), and proceeds to step S12f when determining that the processing of the determination information 19 is executed by the server 300 (YES in step S12e).

In step S12f, the CPU 30 searches the operation history management table 36 based on the user ID 53 of the request 18 and determines whether the user ID 53 is registered in the operation history management table 36 based on a search result as the determination unit 333 (step S12f). That is, it is determined whether the operation history of the user who has transmitted the request 18, that is, the latest operation time 364 is registered in the operation history management table 36.

The CPU 30 proceeds to step S12h when determining that the operation history of the user of the request 18 is not registered (the user ID 53 of the user is not registered in the operation history management table 36) based on the search result (NO in step S12f), and proceeds to step S12g when determining that the operation history of the user of the request 18 is registered (YES in step S12f).

In step S12g, the CPU 30 acquires a table in which the operation history of the user of the request 18 has been excluded (invalidated) from the operation history management table 36 (step S12g). More specifically, the CPU 30 rewrites the latest operation time 364 associated with the user ID 53 of the request 18 to an invalid value in the operation history management table 36, thereby creating a temporary operation history management table 36.

The CPU 30 acquires the table (step S12h). More specifically, the temporary operation history management table 36 is acquired when the temporary operation history management table 36 has been created, and the operation history management table 36 is acquired when the temporary operation history management table 36 has not been created (step S12h). The CPU 30 calculates the priority described above based on information of the acquired table (step S12i, step S12j, and step S12k). That is, the CPU 30 calculates the priority 365 and the priority 367 of the first priority table 37 and the second priority table 38 based on the latest operation time 364 of the operation history management table 36 or the temporary operation history management table 36, and updates the priority 365 and the priority 367 in the first priority table 37 and the second priority table 38 so as to indicate the priorities as calculation results.

In the calculation of the priority, the priority 365 and the priority 367 are calculated without using the latest operation time 364 of the user of the request 18. That is, in a case where there is a possibility that the same user continuously operates the same part, the priorities 365 and 367 are calculated without using the latest operation time 364 of the user.

This is based on the background that it is unnecessary to consider the latest operation time 364 of the user as information to determine the recommended MFP 100 for preventing virus infection regardless of whether a user is infected with a virus in the case where there is a possibility that the same user continuously operates the same part.

The CPU 30 generates the determination information 19 for indicating the recommended MFP 100 based on the calculated priorities 365 and 367 in the first priority table 37 and the second priority table 38 (step S12m). The CPU 30 transfers the generated determination information 19 to the information processing apparatus 200 or the mobile terminal 400 that is the transmission source of the request 18.

The determination information 19 is information for identifying the recommended MFP 100, and includes, for example, the second priority table 38 of FIG. 14 or the device ID 361 of the recommended MFP 100.

For example, in a case where the information processing apparatus 200 that is the transmission source of the request 18 has received a "print" job from the user, "processing based on determination information" is executed. More specifically, the CPU 20 as the printer driver 204 determines from the determination information 19 that the MFP (C) has the highest priority 367 of the "print" job as illustrated in FIG. 14, and determines the MFP (C) as the recommended MFP 100. The CPU 20 transfers the "print" job to the MFP 100 identified by the device ID 361 of the MFP (C). As a result, the MFP 100 of the MFP (C) executes the transferred "print" job.

When it is determined in step S12e that the transmission source apparatus executes the processing of the determination information 19 (NO in step S12e), the CPU 30 transmits the operation history management table 36 (or the temporary operation history management table 36) to the information processing apparatus 200 or the mobile terminal 400 that is the transmission source of the request 18. The information processing apparatus 200 or the mobile terminal 400 executes the processes in step S12i, step S12j, step S12k, and step S12m to acquire the determination information 19 similarly to the above based on the latest operation time 364 of the operation history management table 36 (or the temporary operation history management table 36) received from the server 300. In this manner, the process of determining the recommended MFP 100 from the determination information 19 can be executed by any of the server 300, the information processing apparatus 200, and the mobile terminal 400.

(g4. Processing of Determination Information when Job is Received)

Processing for acquiring the determination information 19 with reception of a print job by the server 300 as a trigger will be described. Note that a type of job that triggers the processing is not limited to the print job. Here, the job information 205 includes the user type 531 (the general user or the service person) in addition to the user ID 53.

Figure 19:
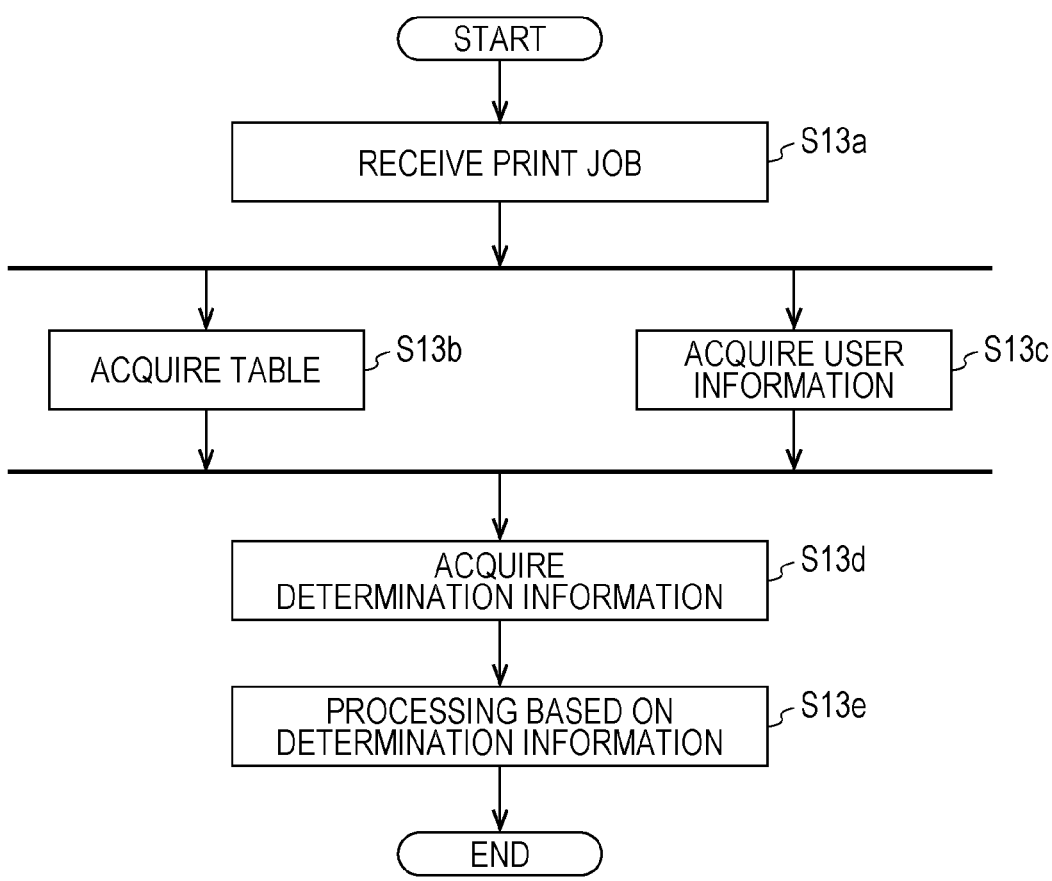
FIG. 19 is a flowchart of the process of managing the user operation on the MFP according to the present embodiment.

Referring to FIG. 19, the CPU 30 of the server 300 receives the job information 205 of the print job from the printer driver 204 of the information processing apparatus 200 or the mobile terminal 400 (step S13a). The CPU 30 acquires the operation history management table 36, the first priority table 37, and the second priority table 38 (step S13b), and also acquires the user information (the user ID 53 and the user type 531 (the general user or the service person)) from the received job information 205 (step S13c).

Figure 18:
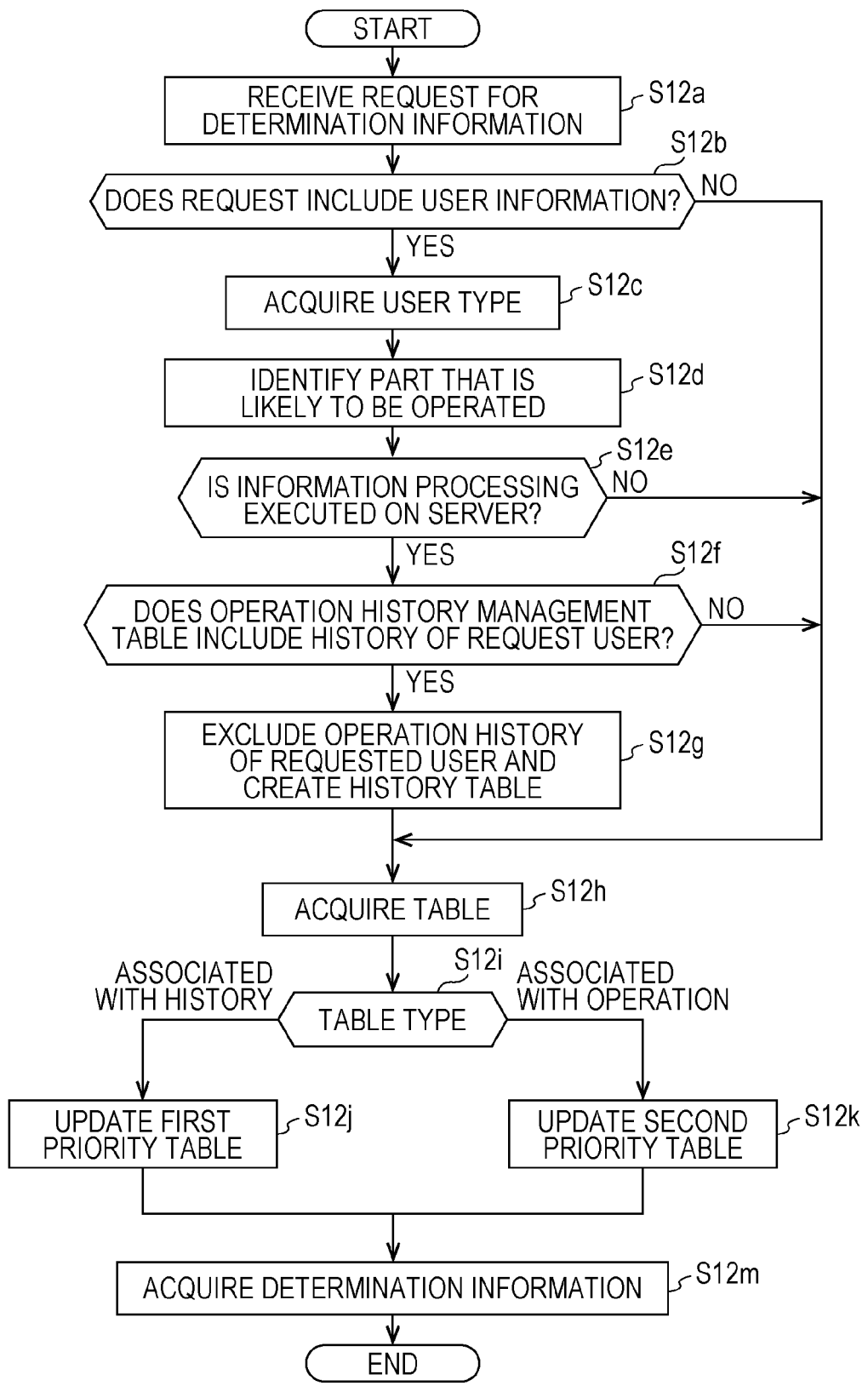
FIG. 18 is a flowchart of the process of managing the user operation on the MFP according to the present embodiment.

The CPU 30 executes the processing for acquiring the determination information 19 illustrated in FIG. 18 based on information in the operation history management table 36, the first priority table 37, the second priority table 38, and the user information (step S13d), and executes the "processing based on determination information" from the obtained determination information 19 to determine the recommended MFP 100 (step S13e). The server 300 transmits information on the recommended MFP 100 to the information processing apparatus 200 or the mobile terminal 400 that is a transmission source of the print job. In addition, the server 300 transfers the received print job to the recommended MFP 100. The recommended MFP 100 executes the print job transferred from the server 300.

The printer driver 204 of the information processing apparatus 200 or the mobile terminal 400 outputs the information on the recommended MFP 100 transferred from the server 300 to the display 23 or the touch panel 44 in order to notify the user of the information. The user can identify the MFP 100 on which the print job is executed from the output information on the recommended MFP 100. The user moves to the recommended MFP 100 and operates the recommended MFP 100 as illustrated in FIG. 11.

(g5. Processing of Requester)

Processing of the information processing apparatus 200 or the mobile terminal 400 that has transmitted the request 18 to the server 300 will be described. For example, a case where the CPU 20 of the information processing apparatus 200 transmits the request 18 as the request processor 510 will be described.

Figure 20:
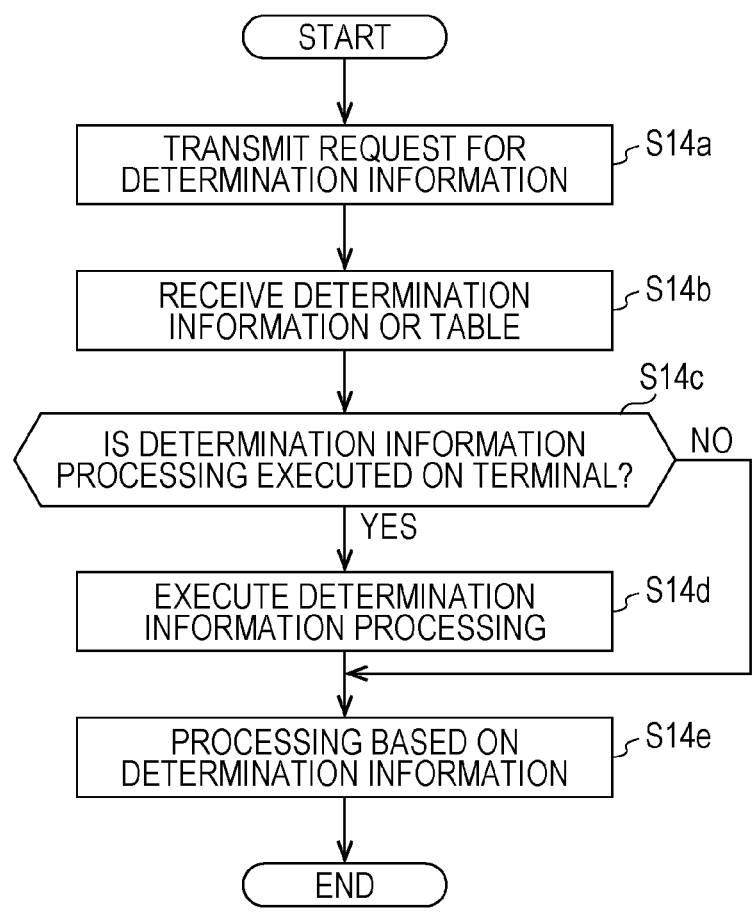
FIG. 20 is a flowchart of the process of managing the user operation on the MFP according to the present embodiment.

Referring to FIG. 20, the CPU 20 transmits the request 18 for the determination information 19 to the server 300 (step S14a). As a response to the request 18, the CPU 20 receives, as the table receiver 540, the operation history management table 36 (or the temporary operation history management table 36), the first priority table 37, and the second priority table 38 and stores the tables in the storage area 550 (step S14b).

The CPU 20 determines whether to execute the above-described "processing of determination information" (step S14c). More specifically, when receiving information of the above tables as the response, the CPU 20 determines to execute the "processing of determination information" (YES in step S14c), and proceeds to step S14d. On the other hand, when the determination information 19 is received by the request processor 510, the CPU 20 determines not to execute the "processing of determination information" (NO in step S14c), and proceeds to step S14e. In step S14d, steps S12c to S12m in FIG. 18 are executed, and the determination information 19 is acquired.

In step S14e, the CPU 20 performs the "processing based on determination information" using the determination information 19 received in step S14c or the determination information 19 acquired in step S14d (step S14e). In the processing based on the determination information, the recommended MFP 100 is determined, and the user is notified of information indicating the recommended MFP 100. In addition, the printer driver 204 of the information processing apparatus 200 transfers a print job to the recommended MFP 100, and the recommended MFP 100 executes the transferred print job.

H. Wireless Communication Between Recommended MFP 100 and Mobile Terminal 400

When the recommended MFP 100 executes a job (for example, a print job) transferred from the printer driver 204 or the server 300, the wireless communication circuit 178 transmits a wireless signal such as a beacon signal. The wireless signal includes a signal indicating the user ID 53 included in the print job.

When the user 500 having the mobile terminal 400 approaches the recommended MFP 100, the mobile terminal 400 receives a beacon signal from the recommended MFP 100 via the wireless communication circuit 45. The CPU 40 of the mobile terminal 400 collates the user ID 53 included in the received beacon signal with a user ID of the own apparatus, and causes the vibrator 43 to vibrate as illustrated in FIG. 10 when determining that a collation result indicates that both the user IDs match. As a result, the user 500 can recognize, by the vibration of the mobile terminal 400 carried by the user, that the user has moved and reached (in proximity to) the recommended MFP 100 that executes the user's own print job.

I. Application Scene

Figure 21:
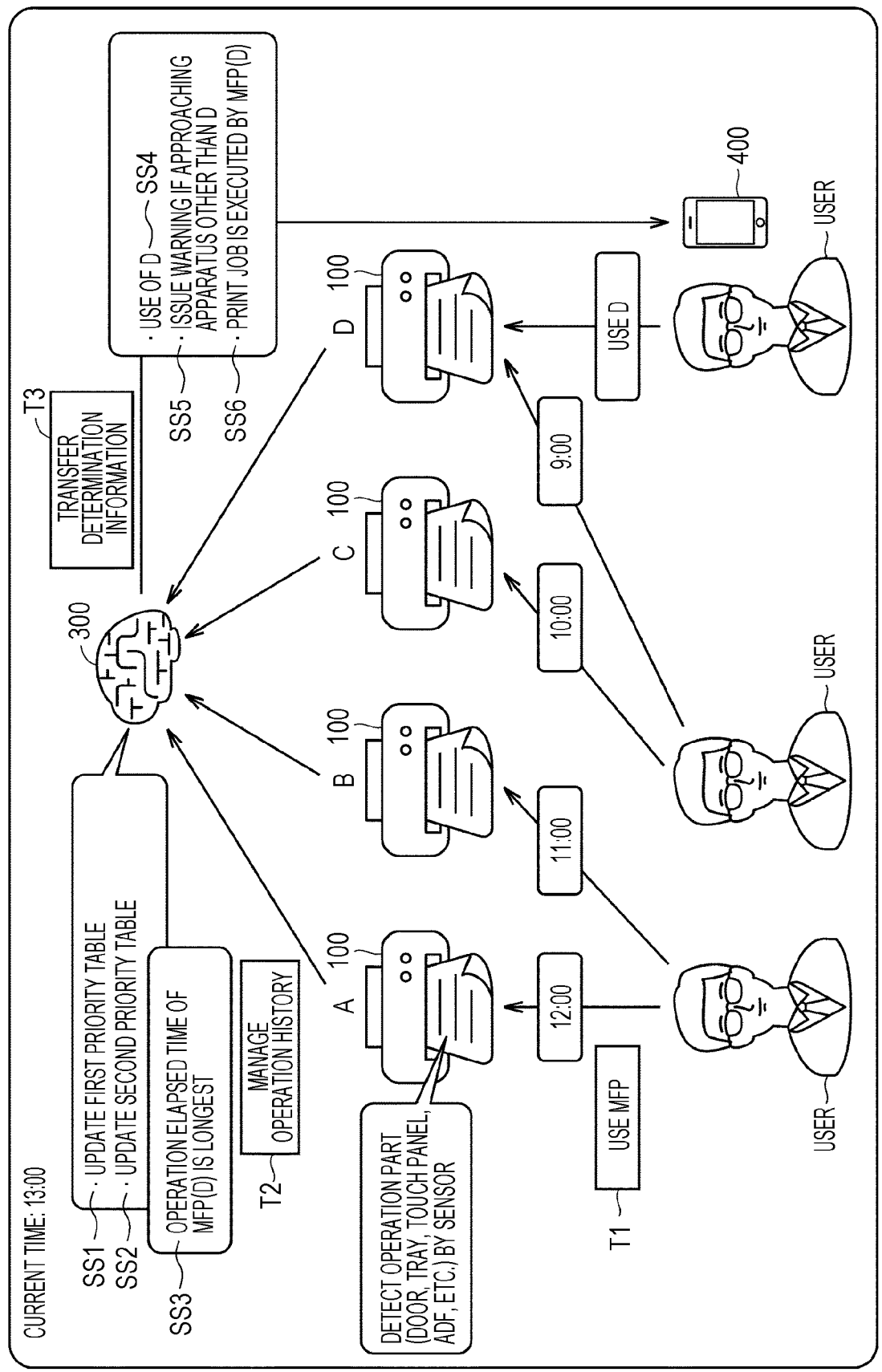
FIG. 21 is a view schematically illustrating an example of a use scene of the MFP according to the present embodiment.
Figure 22:
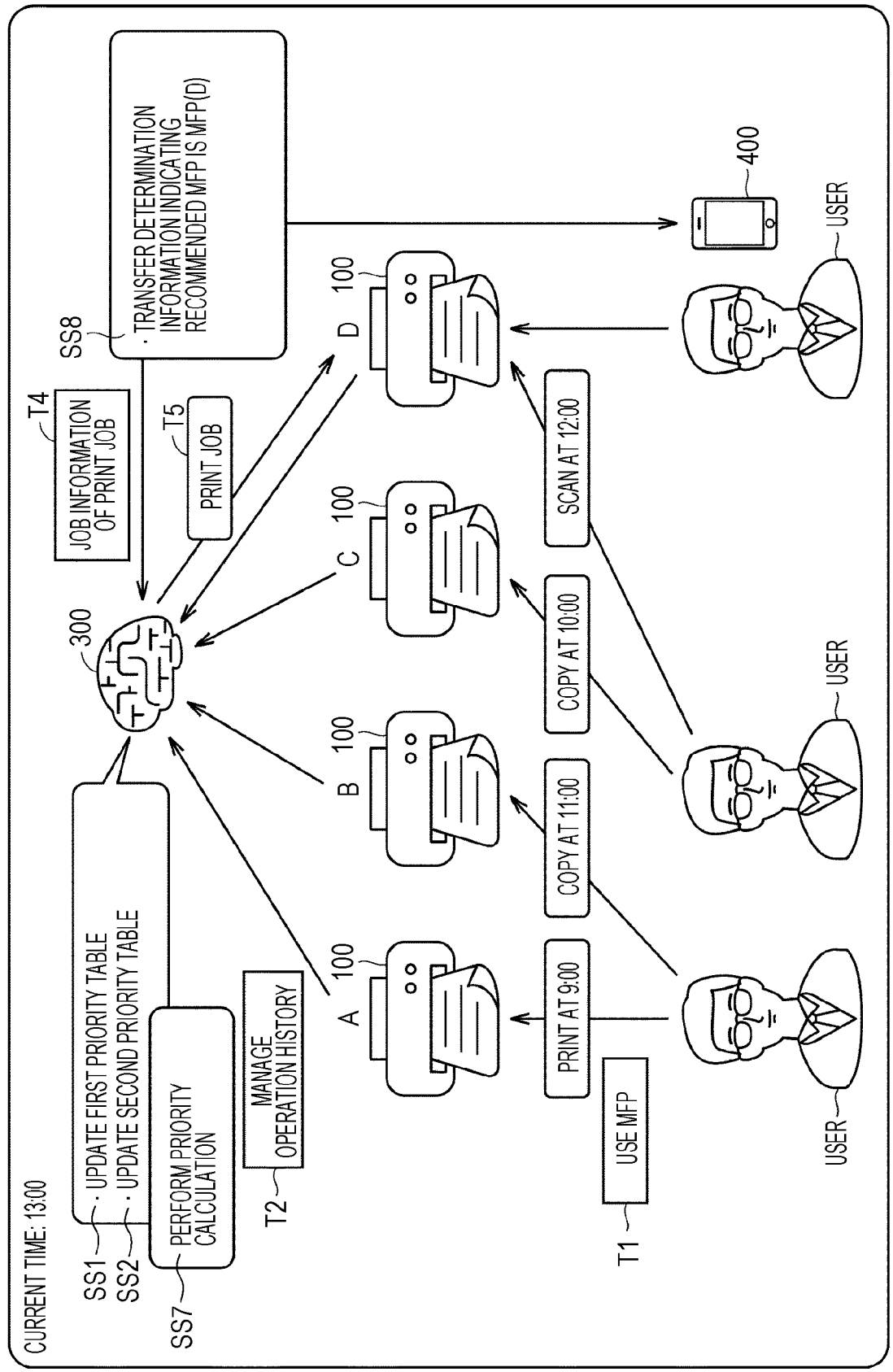
FIG. 22 is a view schematically illustrating the example of the use scene of the MFP according to the present embodiment.
Figure 23:
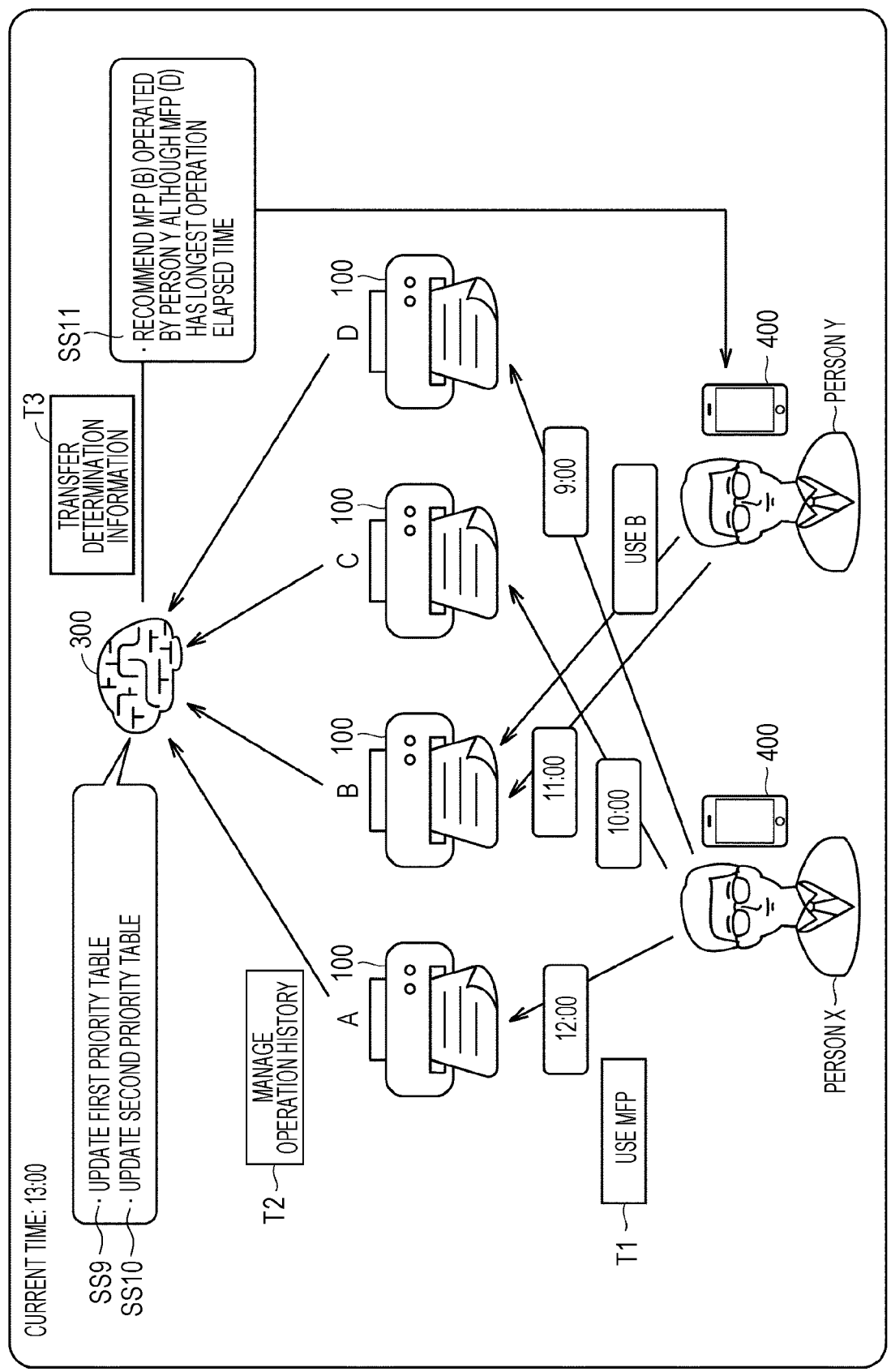
FIG. 23 is a view schematically illustrating an example of the use scene of the MFP according to the present embodiment.

FIGS. 21, 22, and 23 are views schematically illustrating examples of use scenes of the MFP 100 according to the present embodiment. FIGS. 21 to 23 illustrate use states at 13:00 in an environment in which a plurality of users shares a plurality of the MFPs 100 (MFP (A), MFP (B), MFP (C), and MFP (D)) installed in an office.

A scene in which a recommended MFP is determined based on an operation elapsed time will be described with reference to FIG. 21. In FIG. 21, in step T1 of using the MFPs, user operations are performed on the respective MFP 100 of the MFP (A), the MFP (B), the MFP (C), and the MFP (D) at 12:00, 11:00, 10:00, and 9:00. When the user operation is performed, the operation information 163 including an operated part and an operation time is acquired by the sensor group 162 and the sensor I/F 161 of the MFP 100 and transferred to the server 300.

The server 300 updates information in the operation history management table 36 based on the operation information 163 transferred from each of the MFPs 100 (step T2). The CPU 30 calculates the above-described priorities based on operation history management table 36 to update the priority 365 and the priority 367 in the first priority table 37 and the second priority table 38 (steps SS1 and SS2), and determines the recommended MFP 100 with the highest priority based on the updated operation history management table 36 (step SS3). For example, the MFP (D) is determined as the recommended MFP 100 based on the operation elapsed time.

The CPU 30 of the server 300 transmits the determination information 19 indicating that the recommended MFP 100 is the MFP (D) to the mobile terminal 400 (step T3). The user uses the MFP (D) recommended to be used in accordance with the determination information 19 output from the mobile terminal 400. Note that, based on the determination information 19, an output of recommend information from the mobile terminal 400 may include an output recommending use of the MFP (D) (step SS4), a warning output (step SS5) when the user approaches the MFP 100 other than the MFP (D), and an output (step SS6) notifying that a print job is executed by the MFP (D).

As illustrated in FIG. 21, the determination unit 333 or the determination unit 560 is formed to determine a recommended MFP from among the plurality of MFPs 100 based on a length of an elapsed time from the latest operation time 364 of each of the MFPs 100.

In FIG. 21, the determination unit 333 or the determination unit 560 may be formed to calculate an integrated value of the priority 365 based on operation elapsed times of the respective parts of the MFP 100 for each of the MFPs 100 in the first priority table 37, and determine the MFP 100 of which the calculated integrated value indicates a minimum value as the recommended MFP 100. For example, the integrated values are "17" for the MFP (A), "13" for the MFP (B), and "18" for the MFP (C) in FIG. 14, and thus, the MFP (B) is determined as the recommended MFP with "13" which indicates the minimum integrated value. In this manner, the determination unit 333 or the determination unit 560 is formed to determine the recommended MFP recommended to be used from among the plurality of MFPs 100 based on the length of the elapsed time from the latest operation time 364 for each part of each of the MFPs 100.

A scene in which the recommended MFP 100 is determined based on a job type will be described with reference to FIG. 22. In step T1 of FIG. 22, the MFP (A), the MFP (B), the MFP (C), and the MFP (D) execute a print job at 9:00, a copy job at 11:00, a copy job at 10:00, and a scan job at 12:00, respectively. Each of the MFPs 100 acquires the operation information 163 including a part where a user operation has been detected and an operation time when a job is executed by the sensor group 162 and the sensor I/F 161, and transfers the operation information to the server 300.

The server 300 updates information in the operation history management table 36 based on the operation information 163 transferred from each of the MFPs 100 (step T2). When receiving an execution request of the job information 205 of the print job (step T4), the CPU 30 calculates priorities based on the operation history management table 36 (step SS7). The priority 365 and the priority 367 in the first priority table 37 and the second priority table 38 are updated by the priority calculation (steps SS1 and SS2), and the CPU 30 determines the recommended MFP 100 having the highest priority based on the updated priorities (step SS3). For example, the CPU 30 determines the MFP (D) as the recommended MFP 100.

The CPU 30 of the server 300 transmits the determination information 19 indicating that the recommended MFP 100 is the MFP (D) to the mobile terminal 400 (step SS8), transfers the print job execution request to the MFP (D) of the recommended MFP 100, and causes the MFP (D) to execute the print job (step T5). The user moves to the MFP (D) according to the determination information 19 output from the mobile terminal 400, operates the MFP (D), and acquires an output of the print job from the MFP (D).

In FIG. 21, the recommended MFP 100 is determined based on an operation elapsed time. On the other hand, in FIG. 22, the recommended MFP 100 is determined based on the priority 365 and the priority 367 according to a type (operation part) of an executed job. In FIG. 22, since a part operated when a print job is executed is different from a part operated when a scan job is executed, the CPU 30 can acquire the determination information 19 indicating the MFP (D) as the recommended MFP 100.

FIG. 22 illustrates a scene in which the recommended MFP 100 is determined based on the priority 365 and the priority 367 calculated by invalidating (excluding) the latest operation time 364 of the same user. In FIG. 22, in a case where the server 300 receives the job information 205 of Person B, the CPU 30 invalidates the latest operation time 364 associated with the user ID 53 of Person B in the operation history management table 36, and then, calculates the priority 365 of the first priority table 37 and the priority 367 of the second priority table 38 (steps SS9 and SS10). The CPU 30 determines a recommended MFP based on the recalculated priority 365 and priority 367. In FIG. 23, an operation elapsed time of the MFP (D) among the plurality of MFPs 100 is the longest, but the CPU 30 notifies the MFP (B) as the recommended MFP based on a result of the above priority calculation (step SS11).

J. Modification

In the above embodiment, the server 300 serves as the management apparatus that manages the plurality of MFPs 100, but the role of the management apparatus is not limited to the case of being served by the server 300. For example, the information processing apparatus 200 (or the mobile terminal 400) or the MFP 100 may play the role of the management apparatus.

K. Program

A program for causing the MFP 100, the information processing apparatus 200, the mobile terminal 400, and the server 300 to execute the above-described processing is provided. Such a program includes at least a program according to the flowcharts illustrated in FIGS. 16 to 20. The program can also be recorded on a computer-readable recording medium such as a flexible disk, a compact disk-read only memory (CD-ROM), a ROM, a RAM, and a memory card attached to computers of the MFP 100, the information processing apparatus 200, the mobile terminal 400, and the server 300, and provided as a program product. Alternatively, the program can be provided in a state of being recorded on a recording medium such as a hard disk built in a computer. In addition, the program can be provided by being downloaded via a network. The program may be executed by one or more processors such as a CPU, or a combination of a processor and a processor circuit such as an application specific integrated circuit (ASIC) or a field-programmable gate array (FPGA).

Note that the program may call a necessary module in a predetermined array at a predetermined timing among program modules provided as a part of an operating system (OS) of a computer, and cause a processor to execute the processing. In that case, the program itself does not include the modules, and the processing is executed in cooperation with the OS. Such a program not including the modules can also be included in the program of the present embodiment.

In addition, the program according to the present embodiment may be provided in a state of being incorporated in a part of another program. In this case as well, the program itself does not include modules included in the another program described above, and causes a processor to execute the processing in cooperation with the another program. Such a program incorporated in the another program can also be included in the program according to the present embodiment.

Although embodiments of the present invention have been described and illustrated in detail, the disclosed embodiments are made for purposes of illustration and example only and not limitation. The scope of the present invention should be interpreted by terms of the appended claims, and is intended to include all modifications within the meaning and scope equivalent to the scope of claims

What is claimed is:

1. A management apparatus that manages a plurality of image forming apparatuses, the management apparatus comprising:
a storage that stores histories of user operations on the image forming apparatuses for the plurality of image forming apparatuses, respectively, for a plurality of users, wherein each of the image forming apparatuses includes an operation detector that detects the user operations on the image forming apparatus, and the history of each of the image forming apparatuses includes a latest operation time that is a latest time among times when the user operations on the image forming apparatus have been detected;
a hardware processor that
determines an image forming apparatus recommended to be operated from among the plurality of image forming apparatuses based on a length of an elapsed time from the latest operation time of each of the image forming apparatuses using the histories of the user operations of the image forming apparatuses for all of the plurality of users, and
outputs a notification indicating the determined recommended image forming apparatus; and
an operation manager that manages the latest operation time that is a latest time among times when operations of the user on a part have been detected for each of a plurality of the parts of the image forming apparatus for each of the image forming apparatuses, wherein the image forming apparatus includes the plurality of parts that are operable by the user, the image forming apparatus includes a job executor that executes a job accompanied by the user operation on one or more of the parts, and the hardware processor determines the recommended image forming apparatus among the plurality of image forming apparatuses based on a length of an elapsed time from the latest operation time of each of the parts of each of the image forming apparatuses.

2. The management apparatus according to claim 1, wherein the hardware processor determines an image forming apparatus having a longest elapsed time from among the plurality of image forming apparatuses as the recommended image forming apparatus.

3. The management apparatus according to claim 1, wherein
the job executor is capable of executing a plurality of types of the jobs,
the one or more parts to be operated by the user accompanying the execution of the job differ depending on a type of the job, and
the latest operation time of each of the parts includes a latest operation time of each of the one or more parts corresponding to a requested job type.

4. The management apparatus according to claim 1, wherein the storage stores user identification information for identifying the user in association with the latest operation time of the user operation.

5. The management apparatus according to claim 4, wherein the image forming apparatus performs communication of the user identification information with a user mobile terminal in proximity to the image forming apparatus.

6. The management apparatus according to claim 4, wherein when the hardware processor receives a request from the user, the hardware processor excludes the latest operation time associated with the user identification information matching an identifier of the user who is a requester, and determines the recommended image forming apparatus from among the plurality of image forming apparatuses based on the length of the elapsed time from the latest operation time of each of the image forming apparatuses.

7. The management apparatus according to claim 6, wherein
the request includes a job execution request, and
the management apparatus further
transfers the job execution request to the recommended image forming apparatus.

8. The management apparatus according to claim 7, wherein
the management apparatus receives the job execution request from the information processing apparatus or a user mobile terminal, and
the hardware processor
transfers the notification to the information processing apparatus or the user mobile terminal that is a transmission source of the job execution request.

9. The management apparatus according to claim 1, wherein
the hardware processor
transmits the notification to the recommended image forming apparatus, and
the image forming apparatus communicates with a terminal carried by a user approaching the image forming apparatus in accordance with the notification from the management apparatus.

10. The management apparatus according to claim 1, wherein the user includes a service person of the image forming apparatus.

11. The management apparatus according to claim 1, wherein the plurality of parts includes at least one of a door, a touch panel, a sheet feed tray, a sheet discharge tray, and an automatic document feeding unit.

12. The management apparatus according to claim 1, wherein
the image forming apparatus includes a sensor that detects the user operation on each of the parts, and
the management apparatus identifies a part operated by the user from an output of the sensor of each of the parts.

13. The management apparatus according to claim 1, wherein when the length of the elapsed time from the latest operation time exceeds a predetermined length, the latest operation time is deleted from the storage.

14. A system comprising:
a plurality of image forming apparatuses;
an information processing apparatus; and
a server that communicates with the plurality of image forming apparatuses and the information processing apparatus,
wherein each of the plurality of image forming apparatuses detects a user operation on the image forming apparatus by an operation detector of the image forming apparatus and transmits information of the detected user operation to the server, and
the server includes:
a storage that stores, for each of the image forming apparatuses, histories of user operations based on the information of the user operations from the image forming apparatus for a plurality of users, the history of each of the image forming apparatuses including a latest operation time that is a latest time among times when the user operations on the image forming apparatus have been detected;
a hardware processor that
determines an image forming apparatus recommended to be operated from among the plurality of image forming apparatuses based on a length of an elapsed time from the latest operation time of each of the image forming apparatuses using the histories of the user operations of each of the image forming apparatuses for all of the plurality of users, and
outputs a notification indicating the determined recommended image forming apparatus; and
an operation manager that manages the latest operation time that is a latest time among times when operations of the user on a part have been detected for each of a plurality of the parts of the image forming apparatus for each of the image forming apparatuses, wherein the image forming apparatus includes the plurality of parts that are operable by the user, the image forming apparatus includes a job executor that executes a job accompanied by the user operation on one or more of the parts, and the hardware processor determines the recommended image forming apparatus among the plurality of image forming apparatuses based on a length of an elapsed time from the latest operation time of each of the parts of each of the image forming apparatuses.

15. A method for managing a plurality of image forming apparatuses, the method comprising:
detecting a user operation on each of the plurality of image forming apparatuses by an operation detector of the image forming apparatus for each of the image forming apparatuses for a plurality of users;
storing histories of the detected user operations for each of the image forming apparatuses for the plurality of users, the history of each of the image forming apparatuses including a latest operation time that is a latest time among times when the user operations on the image forming apparatus have been detected;
determining an image forming apparatus recommended to be operated from among the plurality of image forming apparatuses based on a length of an elapsed time from the latest operation time of each of the image forming apparatuses using the histories of the user operations of each of the image forming apparatuses for all of the plurality of users;
outputting a notification indicating the determined recommended image forming apparatus; and
managing the latest operation time that is a latest time among times when operations of the user on a part have been detected for each of a plurality of the parts of the image forming apparatus for each of the image forming apparatuses, wherein the image forming apparatus includes the plurality of parts that are operable by the user, the image forming apparatus includes a job executor that executes a job accompanied by the user operation on one or more of the parts, and the recommended image forming apparatus among the plurality of image forming apparatuses is determined based on a length of an elapsed time from the latest operation time of each of the parts of each of the image forming apparatuses.

16. A non-transitory recording medium storing a computer readable program for causing a processor to execute the method according to claim 15.

* * * * *